(12) United States Patent
Matsumori et al.

(10) Patent No.: US 8,330,930 B2
(45) Date of Patent: Dec. 11, 2012

(54) LIQUID CRYSTAL DISPLAY DEVICE HAVING COLUMN SPACER RECEIVING MEMBERS FORMED OF THE SAME MATERIAL AS A MATERIAL OF ONE OF THE PAIR OF ELECTRODES FOR APPLYING AN ELECTRIC FIELD TO THE LIQUID CRYSTAL MATERIAL

(75) Inventors: Masaki Matsumori, Naka-gun (JP);
Yasushi Tomioka, Hitachinaka (JP);
Kotaro Araya, Hitachiota (JP)

(73) Assignees: Hitachi Displays, Ltd., Chiba (JP);
Panasonic Liquid Crystal Display Co., Ltd., Hyogo-ken (JP)

( * ) Notice: Subject to any disclaimer, the term of this patent is extended or adjusted under 35 U.S.C. 154(b) by 240 days.

(21) Appl. No.: 12/640,333

(22) Filed: Dec. 17, 2009

(65) Prior Publication Data
US 2010/0165278 A1     Jul. 1, 2010

(30) Foreign Application Priority Data
Dec. 26, 2008   (JP) ................................. 2008-331723

(51) Int. Cl.
*G02F 1/1343*   (2006.01)
*G02F 1/1339*   (2006.01)
*G02F 1/1337*   (2006.01)
(52) U.S. Cl. ......... 349/156; 349/123; 349/141; 349/155
(58) Field of Classification Search .................. 349/123, 349/141, 155–156
See application file for complete search history.

(56) References Cited

U.S. PATENT DOCUMENTS

| 5,181,132 | A  | * | 1/1993  | Shindo et al. ................. 349/155 |
| 2003/0071956 | A1 |   | 4/2003  | Sasaki |
| 2004/0233378 | A1 | * | 11/2004 | Okamoto et al. ............. 349/156 |
| 2005/0253991 | A1 | * | 11/2005 | Chang ........................... 349/147 |
| 2006/0285060 | A1 |   | 12/2006 | Misaki et al. |

FOREIGN PATENT DOCUMENTS

| JP | 2003-121859 |   | 4/2003 |
| JP | 2006-330470 |   | 12/2006 |
| JP | 2009-042629 | * | 2/2009 |

* cited by examiner

*Primary Examiner* — Lauren Nguyen
(74) *Attorney, Agent, or Firm* — Antonelli, Terry, Stout & Kraus, LLP.

(57) ABSTRACT

Provided is a liquid crystal display device including: a plurality of column spacers and a first alignment film which are formed above the first substrate; an insulating layer which is formed on the second substrate and a second alignment film which is formed on the insulating layer; and column spacer receiving members which are provided between the insulating layer and the second alignment film in places opposed to the plurality of column spacers, the column spacer receiving members each being made of a material different from both of a material of the insulating layer and a material of the second alignment film, in which a thickness of the second alignment film in places above the column spacer receiving members is ⅓ or less of a thickness of the second alignment film in places in which the second alignment film is formed directly on the insulating layer.

22 Claims, 25 Drawing Sheets

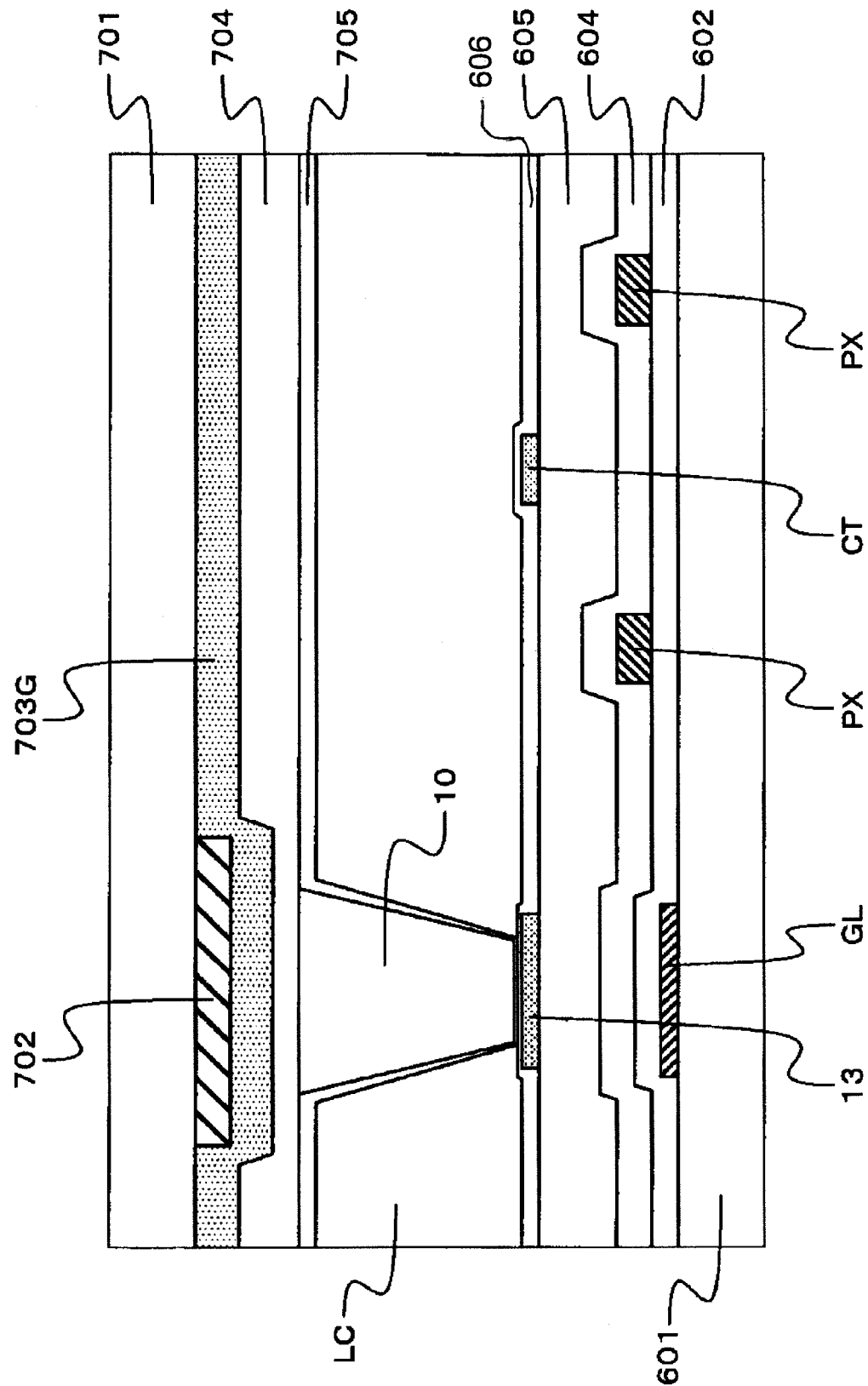

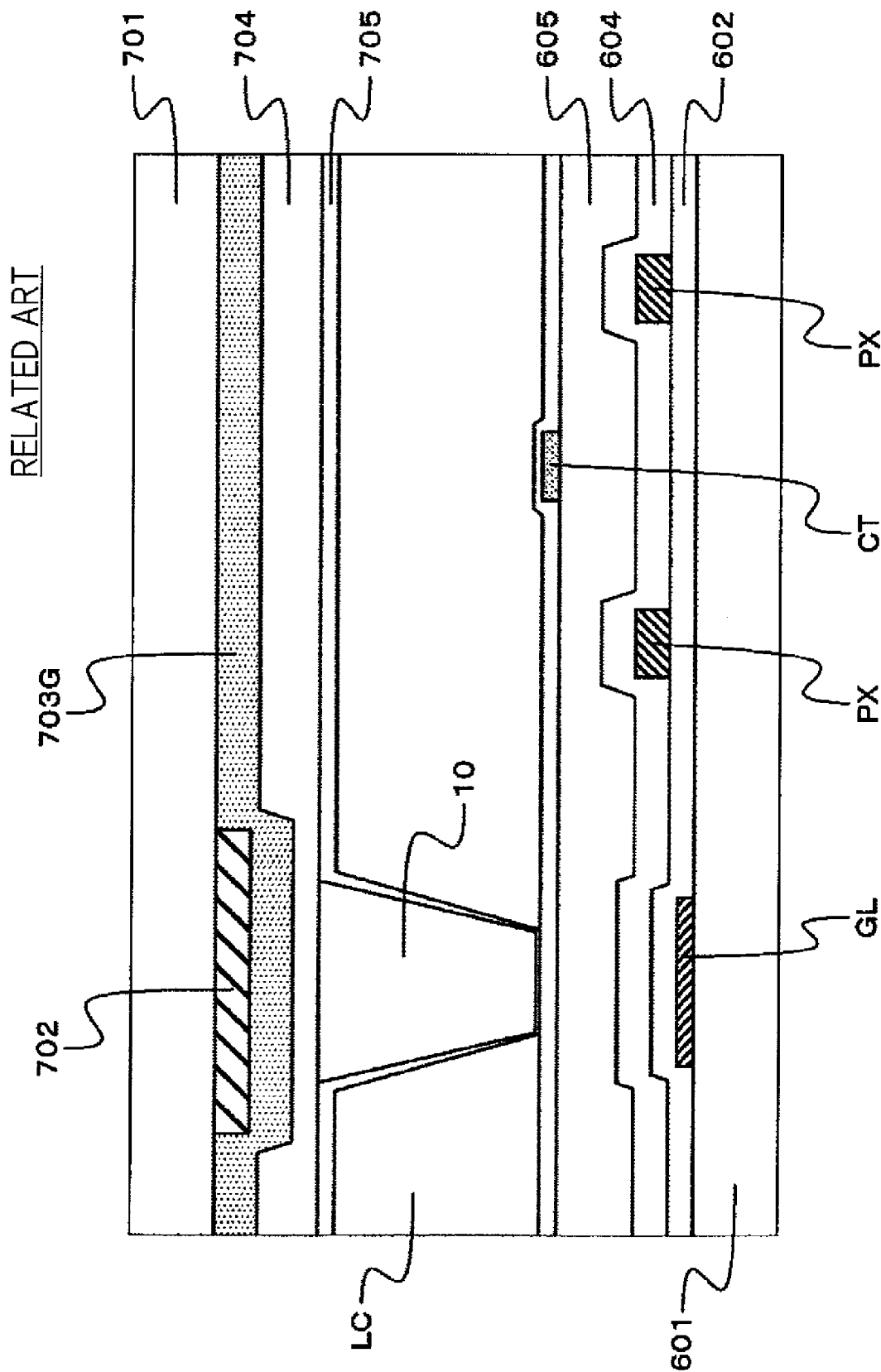

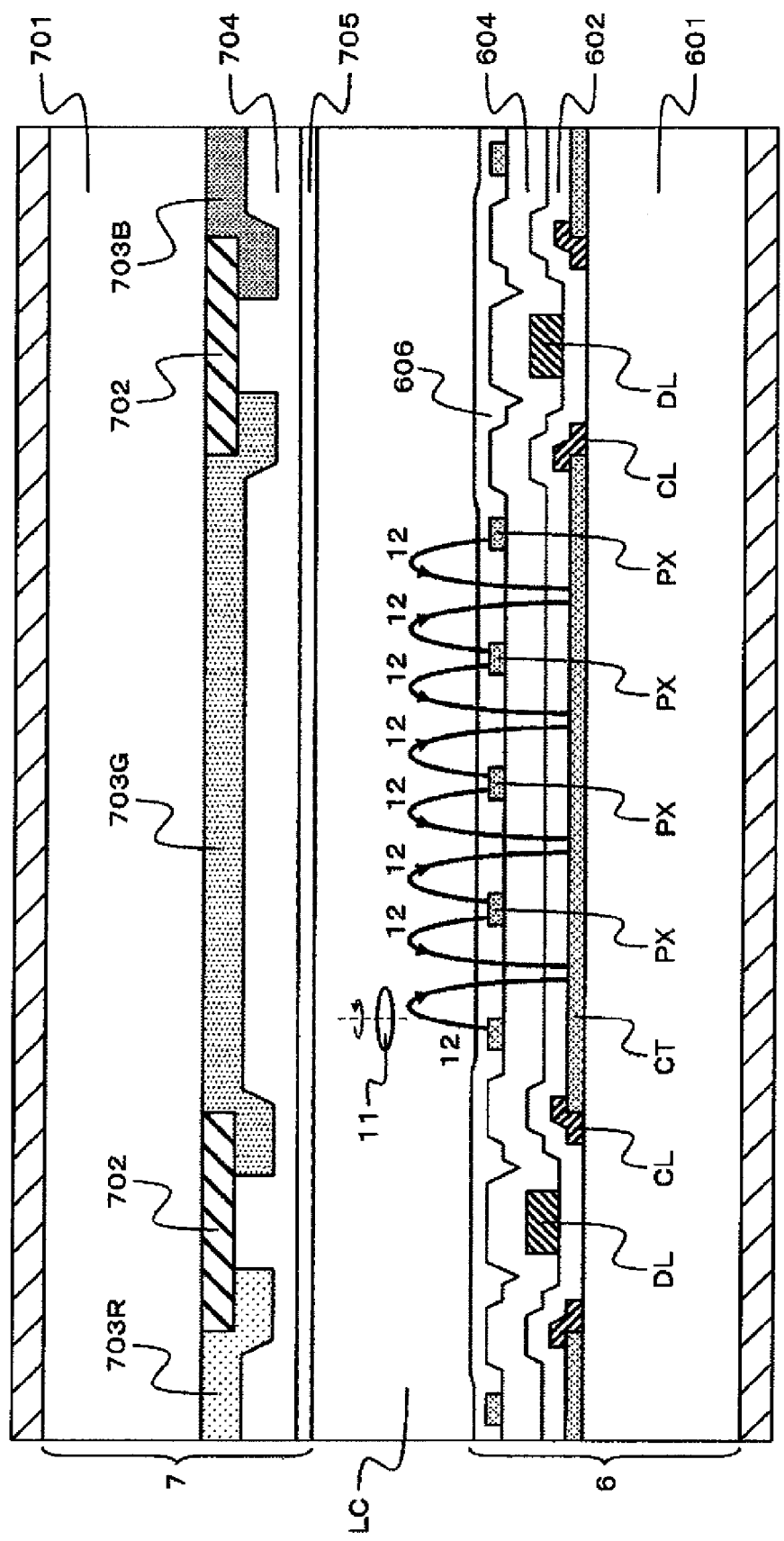

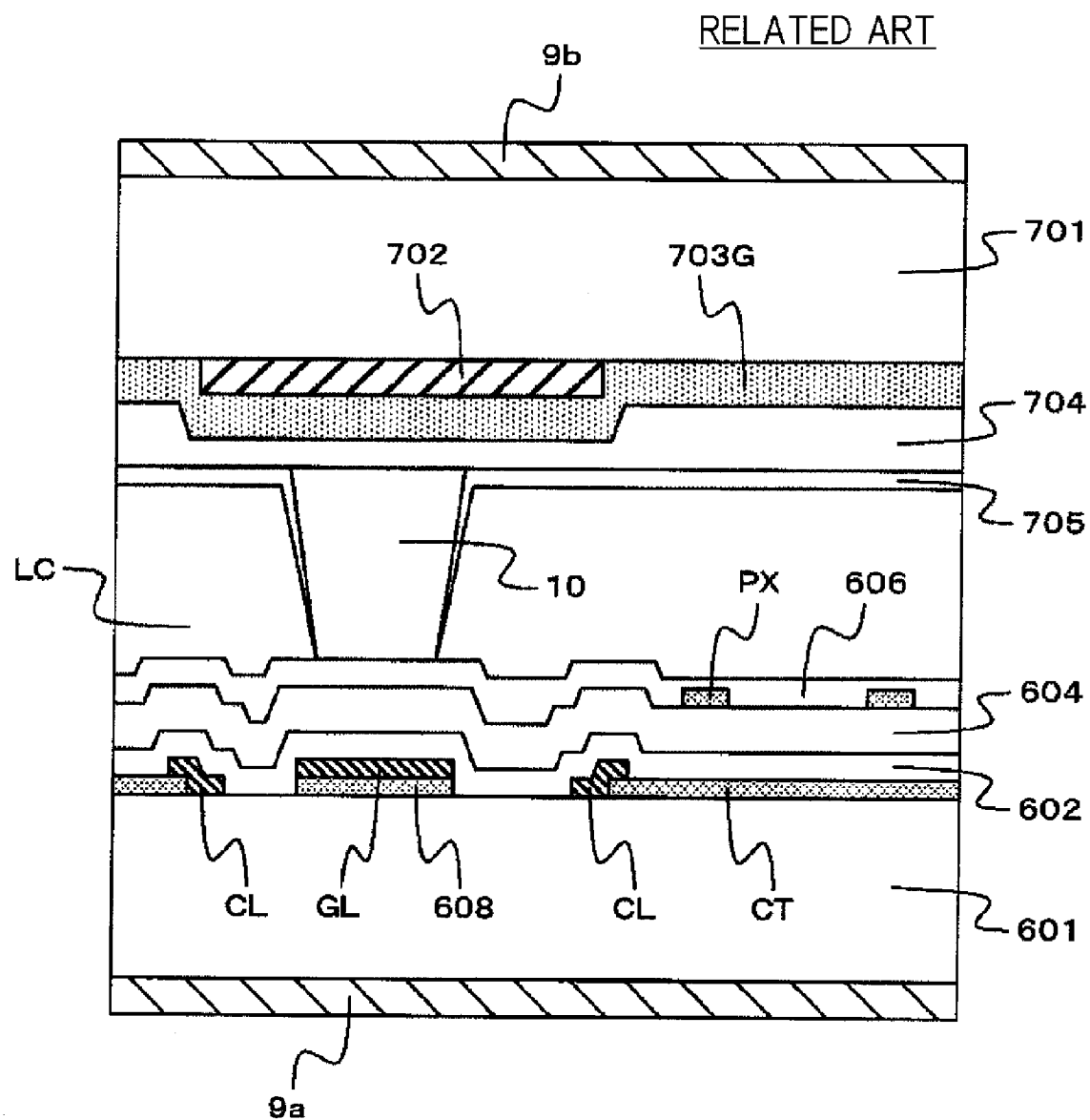

LIQUID CRYSTAL DISPLAY DEVICE HAVING COLUMN SPACER RECEIVING MEMBERS FORMED OF THE SAME MATERIAL AS A MATERIAL OF ONE OF THE PAIR OF ELECTRODES FOR APPLYING AN ELECTRIC FIELD TO THE LIQUID CRYSTAL MATERIAL

CROSS-REFERENCE TO RELATED APPLICATION

The present application claims priority from Japanese application JP 2008-331723 filed on Dec. 26, 2008, the content of which is hereby incorporated by reference into this application.

BACKGROUND OF THE INVENTION

1. Field of the Invention

The present invention relates to a liquid crystal display device, and more particularly, to a technology effectively applied to a liquid crystal display device that uses a column spacer to give pixels a uniform cell gap.

2. Description of the Related Art

More and more uses are being found for liquid crystal display devices (liquid crystal displays) because of their features such as high display quality and the ease of reduction in thickness, weight, and power consumption. The various uses of liquid crystal display devices include a display (monitor) for cellular phones, digital still cameras, and other portable electronic devices, a display for personal computers, a display for printing and designing, a display for medical equipment, and a liquid crystal television set.

With the expansion of uses mentioned above, the demand for liquid crystal display devices to have a higher image quality is ever increasing in recent years. In medical equipment displays and liquid crystal television sets, in particular, the quality of image display in black color is very important, and a liquid crystal display device capable of displaying uniformly in black without unevenness at a low luminance is seriously sought after.

A display panel used in a liquid crystal display device (liquid crystal display panel) is structured such that a liquid crystal material (liquid crystal layer) is placed between a pair of substrates, and has a display area constituted of many pixels. The liquid crystal display panel employs, for example, a method of dispersing bead spacers (spherical spacer members) between the paired substrates or a method of forming column spacers on any one of the paired substrates to make the liquid crystal layer thickness (cell gap) uniform in each pixel. The method of forming column spacers on any one of the paired substrates is mainly employed in liquid crystal display panels for liquid crystal display devices that are required to have high image quality.

A variation of the method of forming column spacers on any one of the paired substrates has been proposed in which misalignment between the top of a column spacer and a column spacer receiving portion, which is provided on the other substrate where no column spacers are formed, is prevented by providing the column spacer receiving portion with a protrusion and fitting the protrusion into the column spacer (see, for example, JP 2006-330470 A).

Providing a mount (protrusion) in the column spacer receiving portion on a substrate where no column spacers are formed as in a liquid crystal display panel described in JP 2006-330470 A may solve the problem of light leakage due to misalignment between the substrates which is caused when, for example, surface pressing is performed on the liquid crystal display panel.

However, an examination by the inventors of the present invention has revealed that providing the mount (protrusion) does not prevent minute bright spots from appearing all over the panel when the liquid crystal display panel is given a slight shake. This indicates that vibrations applied during the transportation of the liquid crystal display panel or other times cause minute bright spots within the screen, thus posing a serious problem for image quality improvement, in particular, display quality improvement in a low luminance (low gray scale) part such as a part displayed in black color.

A research conducted by the inventors of the present invention has revealed that the minute bright spots mentioned above are caused by a mechanism in which an alignment film between the column spacer and the mount is chipped due to vibrations applied to the liquid crystal display panel, and flakes of the alignment film floating in the liquid crystal within the display area disturb the alignment of the liquid crystal.

SUMMARY OF THE INVENTION

It is therefore an object of the present invention to provide a technology capable of preventing minute bright spots in a liquid crystal display device.

The aforementioned and other objects of the present invention as well as novel features of the present invention become clear from the description given herein and the accompanying drawings.

Representative aspects of the present invention disclosed herein are outlined as follows.

(1) A liquid crystal display device, including: a first substrate; a second substrate which is opposed to the first substrate; a liquid crystal material which is placed between the first substrate and the second substrate; a plurality of column spacers and a first alignment film which are formed above the first substrate; an insulating layer which is formed on the second substrate and a second alignment film which is formed on the insulating layer; and column spacer receiving members which are provided between the insulating layer and the second alignment film in places opposed to the plurality of column spacers, the column spacer receiving members each being made of a material different from both of a material of the insulating layer and a material of the second alignment film, in which a thickness of the second alignment film in places above the column spacer receiving members is ⅓ or less of a thickness of the second alignment film in places in which the second alignment film is formed directly on the insulating layer.

(2) A liquid crystal display device, including: a first substrate; a second substrate which is opposed to the first substrate; a liquid crystal material which is placed between the first substrate and the second substrate; a plurality of column spacers and a first alignment film which are formed above the first substrate; an insulating layer which is formed on the second substrate and a second alignment film which is formed on the insulating layer, the second alignment film having openings formed therein in places opposed to the plurality of column spacers; and column spacer receiving members which are formed in the openings of the second alignment film, the column spacer receiving members each being made of a material different from both of a material of the insulating layer and a material of the second alignment film.

A liquid crystal display device of the present invention may prevent minute bright spots caused by the flaking of an alignment film and therefore is capable of, for example, displaying uniformly in black color without unevenness at a low luminance.

BRIEF DESCRIPTION OF THE DRAWINGS

In the accompanying drawings:

FIG. 2F is a schematic sectional view illustrating an example of a sectional structure cut along the line IIF-IIF of FIG. 2B;

FIG. 3 is a schematic sectional view illustrating an example of a schematic structure of a liquid crystal display panel that is used for comparison with the liquid crystal display panel of the first embodiment;

FIG. 4B is a schematic sectional view illustrating an example of a sectional structure cut along the line IVB-IVB of FIG. 4A;

FIG. 5 is a schematic sectional view illustrating an example of a schematic structure of a liquid crystal display panel that is used for comparison with the liquid crystal display panel of the second embodiment;

DETAILED DESCRIPTION OF THE INVENTION

A mode of carrying out the present invention is described below in detail with reference to the drawings.

Throughout the drawings illustrating embodiments of the present invention, components that have the same function are denoted by the same reference symbol in order to avoid repetitive descriptions.

FIGS. 1A to 1D are schematic diagrams illustrating an example of the schematic structure of a liquid crystal display device according to this embodiment mode.

Figure 1A:
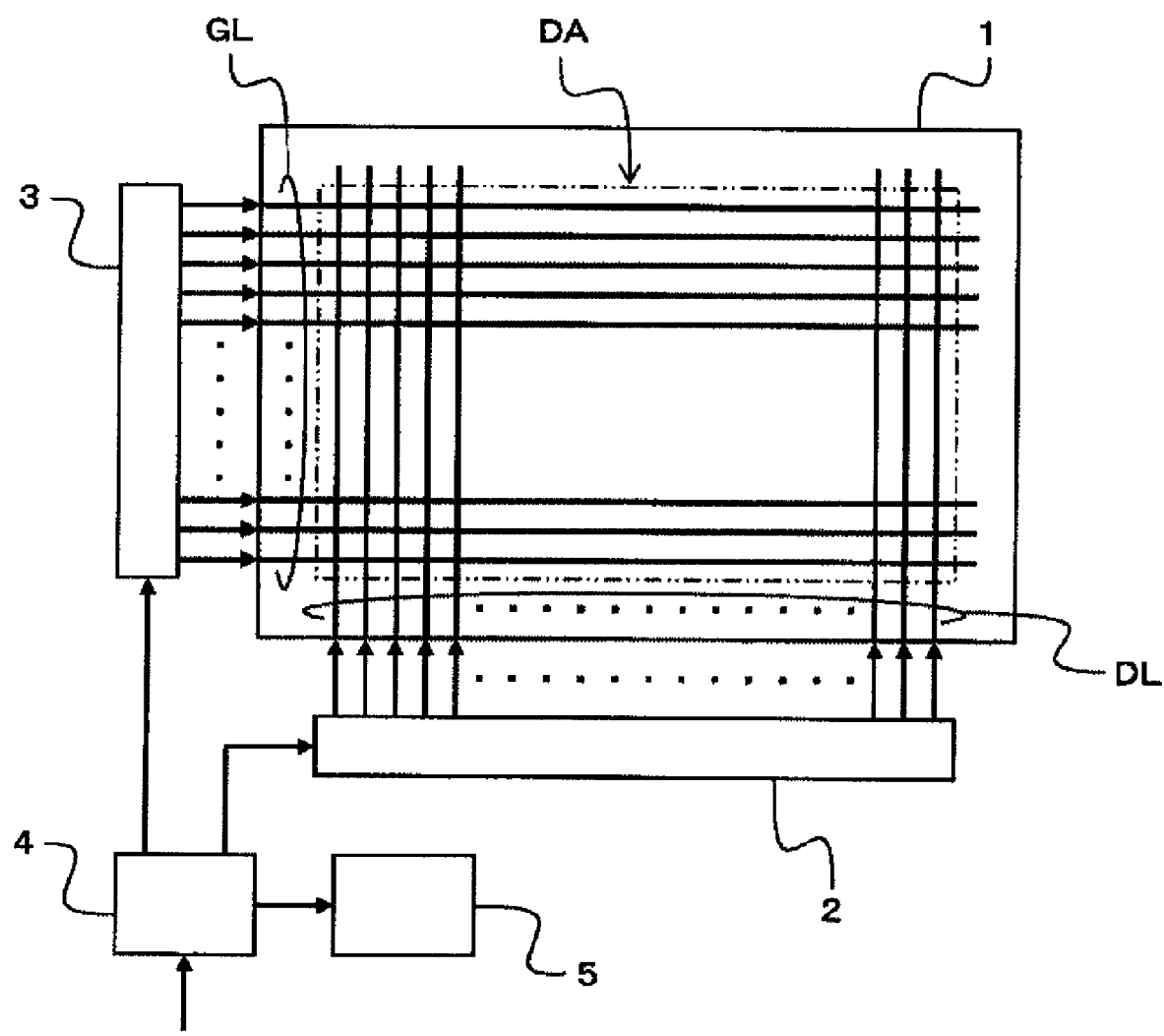
FIG. 1A is a schematic block diagram illustrating an example of a schematic structure of a liquid crystal display device according to the present invention.
Figure 1B:
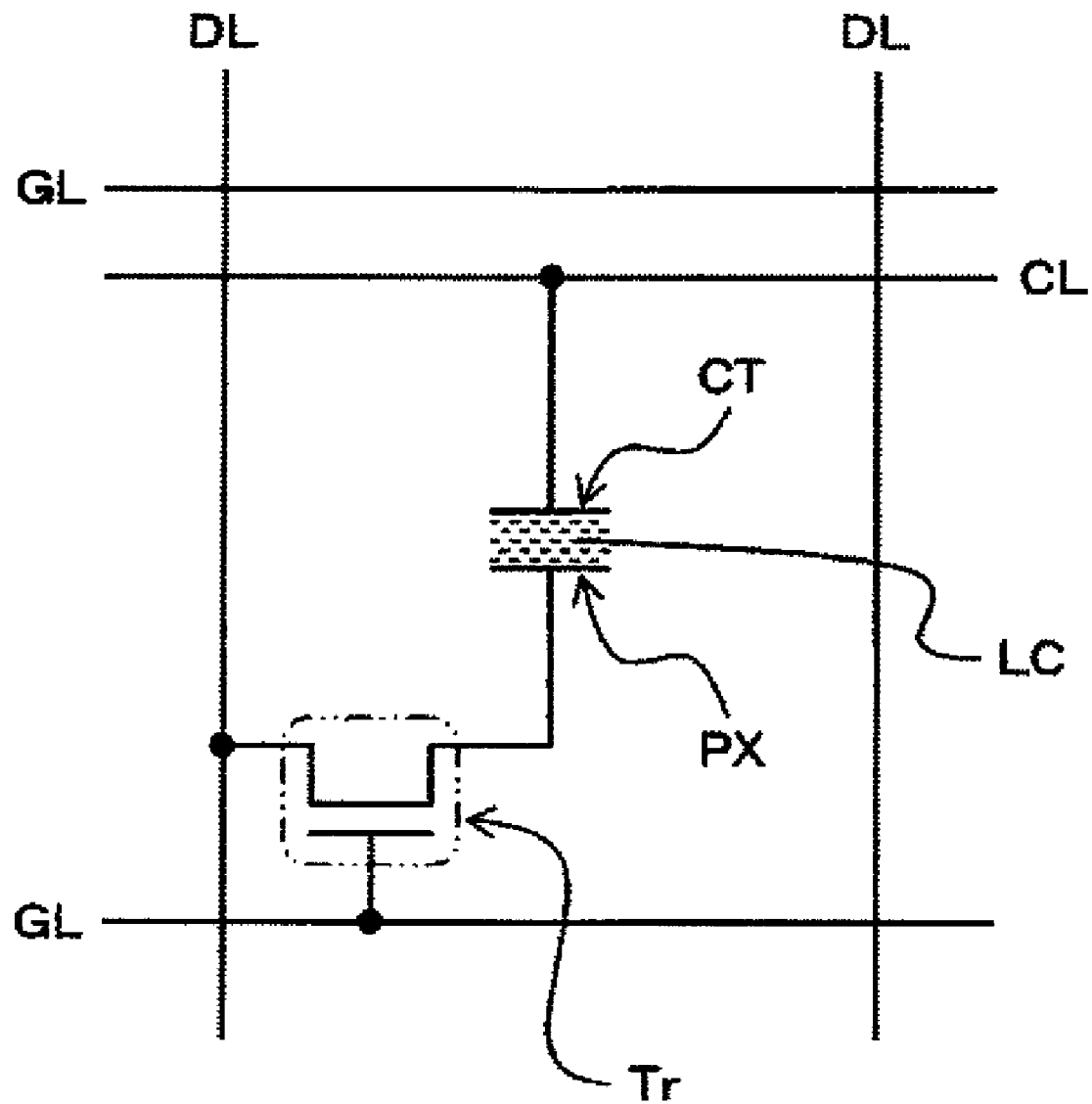
FIG. 1B is a schematic circuit diagram illustrating an example of a circuit structure of a single pixel of a liquid crystal display panel.
Figure 1C:
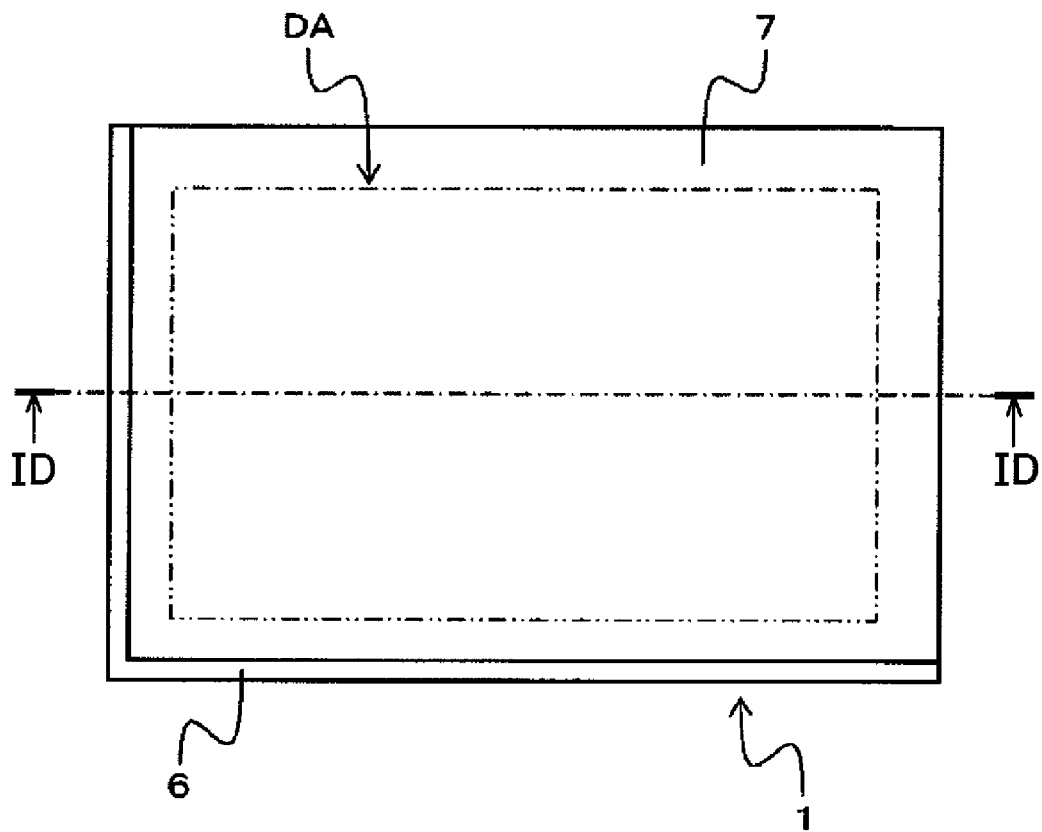
FIG. 1C is a schematic plan view illustrating an example of a schematic structure of the liquid crystal display panel.
Figure 1D:
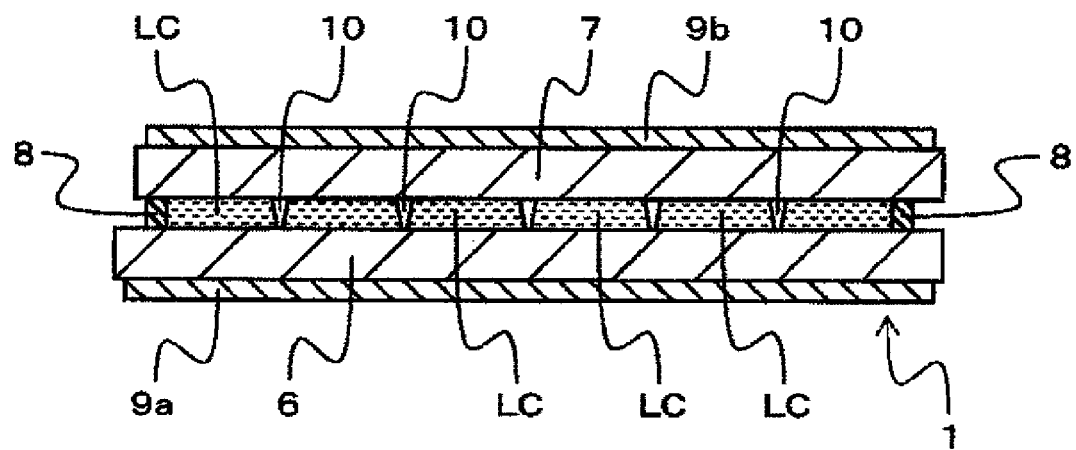
FIG. 1D is a schematic sectional view illustrating an example of a sectional structure cut along the line ID-ID of FIG. 1C.

FIG. 1A is a schematic block diagram illustrating an example of the schematic structure of the liquid crystal display device according to this embodiment mode. FIG. 1B is a schematic circuit diagram illustrating an example of the circuit structure of a single pixel of a liquid crystal display panel. FIG. 1C is a schematic plan view illustrating an example of the schematic structure of the liquid crystal display panel. FIG. 1D is a schematic sectional view illustrating an example of a sectional structure cut along the line ID-ID of FIG. 1C.

This embodiment mode is applied to an active matrix liquid crystal display device, for example. An active matrix liquid crystal display device is used in, for example, a display (monitor) for portable electronic devices, a display for personal computers, a display for printing and designing, a display for medical equipment, and a liquid crystal television set.

An active matrix liquid crystal display device includes, for example, a liquid crystal display panel 1, a first driver circuit 2, a second driver circuit 3, a control circuit 4, and a backlight 5 as illustrated in FIG. 1A.

The liquid crystal display panel 1 includes a plurality of scanning signal lines GL and a plurality of video signal lines DL. The video signal lines DL are connected to the first driver circuit 2 and the scanning signal lines GL are connected to the second driver circuit 3. FIG. 1A illustrates only some of the plurality of scanning signal lines GL. In the actual liquid crystal display panel 1, many more scanning signal lines GL are arranged densely. Similarly, FIG. 1A illustrates only some of the plurality of video signal lines DL, and many more video signal lines DL are arranged densely in the actual liquid crystal display panel 1.

A display area DA of the liquid crystal display panel 1 is an aggregation of many pixels. A single pixel occupies an area in the display area DA that corresponds to an area surrounded by two adjacent scanning signal lines GL and two adjacent video signal lines DL. The circuit structure of a single pixel is as illustrated in FIG. 1B, and includes a TFT device Tr, which functions as an active device, a pixel electrode PX, a common electrode CT (also called a counter electrode), and a liquid crystal layer LC. The liquid crystal display panel 1 in this example is provided with, for example, a sharing enabling wiring line CL which makes the common electrodes CL of a plurality of pixels common to the pixels.

The liquid crystal display panel 1 is structured, for example, as illustrated in FIGS. 1C and 1D, where the liquid crystal layer LC (liquid crystal material) is formed between an active matrix substrate 6 and a counter substrate 7. The active matrix substrate 6 and the counter substrate 7 are bonded to each other with a ring-like sealant 8, which is placed outside the display area DA. The liquid crystal layer LC is tightly sealed in a space surrounded by the active matrix substrate 6, the counter substrate 7, and the sealant 8. The liquid crystal display panel 1 of the liquid crystal display device having the backlight 5 includes a pair of polarizing plates 9a and 9b opposed to each other with the active matrix substrate 6, the liquid crystal layer LC, and the counter substrate 7 being interposed therebetween.

The active matrix substrate 6 is an insulating substrate, such as a glass substrate, on which the scanning signal lines GL, the video signal lines DL, the active devices (TFT devices Tr), the pixel electrodes PX, and other components are disposed. In the case where the liquid crystal display panel 1 is driven by in-plane switching (IPS) or other lateral field driving methods, the common electrodes CT and the sharing enabling wiring line CL are formed on the active matrix substrate 6. In the case where the liquid crystal display panel 1 is driven by vertical alignment (VA), twisted nematic (TN), or other vertical field driving methods, the common electrode CT is formed on the counter substrate 7. In the case of the liquid crystal display panel 1 driven by the vertical field driving methods, the common electrode CT is usually a large sheet of flat electrode shared by all pixels, and the sharing enabling wiring line CL is not provided.

In the liquid crystal display device according to this embodiment mode, the space in which the liquid crystal layer LC is tightly sealed is provided with, for example, a plurality of column spacers 10 for making the thickness of the liquid crystal layer LC (also referred to as cell gap) uniform in each pixel. The plurality of column spacers 10 are formed on, for example, the counter substrate 7.

The first driver circuit 2 is a driver circuit that generates video signals (also referred to as gray scale voltages) to be applied to the pixel electrodes PX of the individual pixels through the video signal lines DL, and that is commonly called a source driver or a data driver. The second driver circuit 3 is a driver circuit that generates scanning signals to be applied to the scanning signal lines GL, and that is commonly called a gate driver or a scanning driver. The control circuit 4 is a control circuit that controls the operation of the first driver circuit 2, the operation of the second driver circuit 3, and the luminance of the backlight 5, and that is commonly called a TFT controller or a timing controller. The backlight 5 is a light source such as a fluorescent light (e.g., cold cathode fluorescent light) or a light emitting diode (LED). Light emitted from the backlight 5 is transformed into a sheet-like beam of light through a reflector panel, optical waveguide, light diffuser panel, prism sheet, or the like, which are not illustrated, and the beam is cast on the liquid crystal display panel 1.

This embodiment mode is directed to the liquid crystal display panel 1 of the active matrix liquid crystal display device described above, in particular, the structures of a part where the top of each column spacer 10 is in contact with the active matrix substrate 6 (hereinafter, referred to as column spacer receiving portion) and its peripheries. Detailed descriptions on the structures of the first driver circuit 2, the second driver circuit 2, the control circuit 4, and the backlight 5, which are not directly related to this embodiment mode, are therefore omitted.

[First Embodiment]

FIGS. 2A to 2F are schematic diagrams illustrating an example of the schematic structure of a liquid crystal display panel according to a first embodiment of the present invention.

Figure 2A:
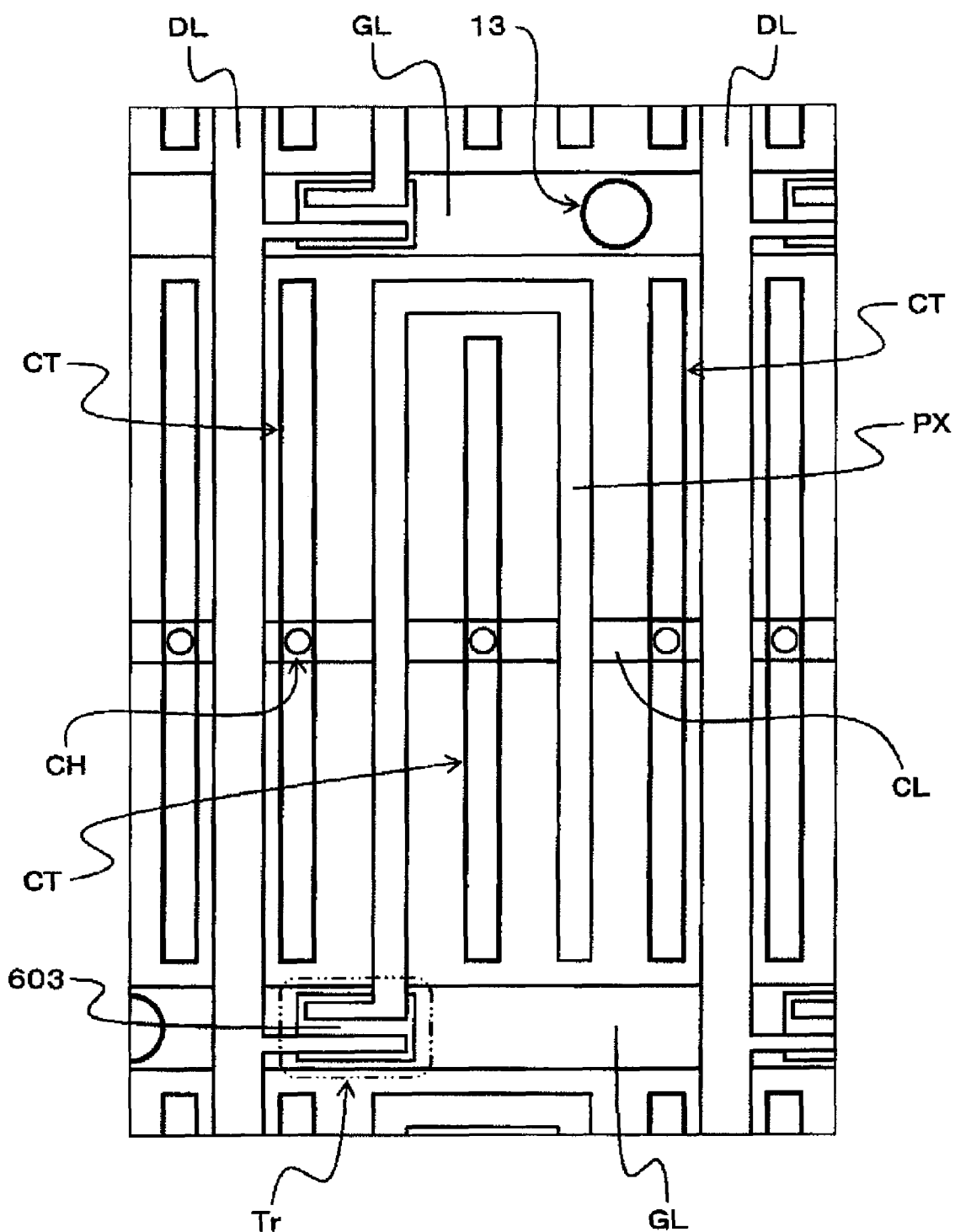
FIG. 2A is a schematic plan view illustrating an example of a planar structure of a single pixel of an active matrix substrate in a liquid crystal display panel according to a first embodiment of the present invention.
Figure 2B:
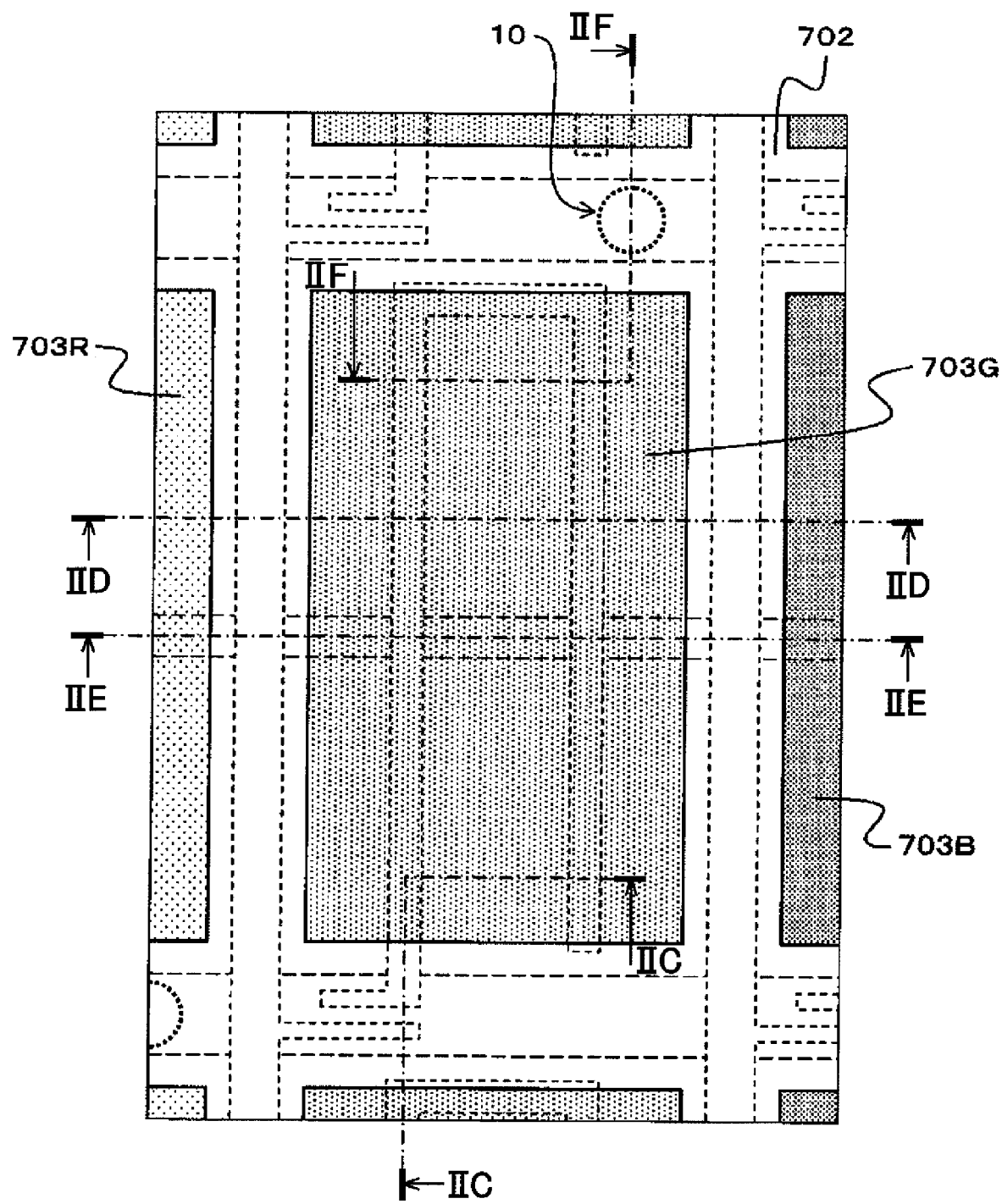
FIG. 2B is a schematic plan view illustrating an example of the planar structure of the pixel in which a counter substrate is laid on top of an area illustrated in FIG. 2A.
Figure 2C:
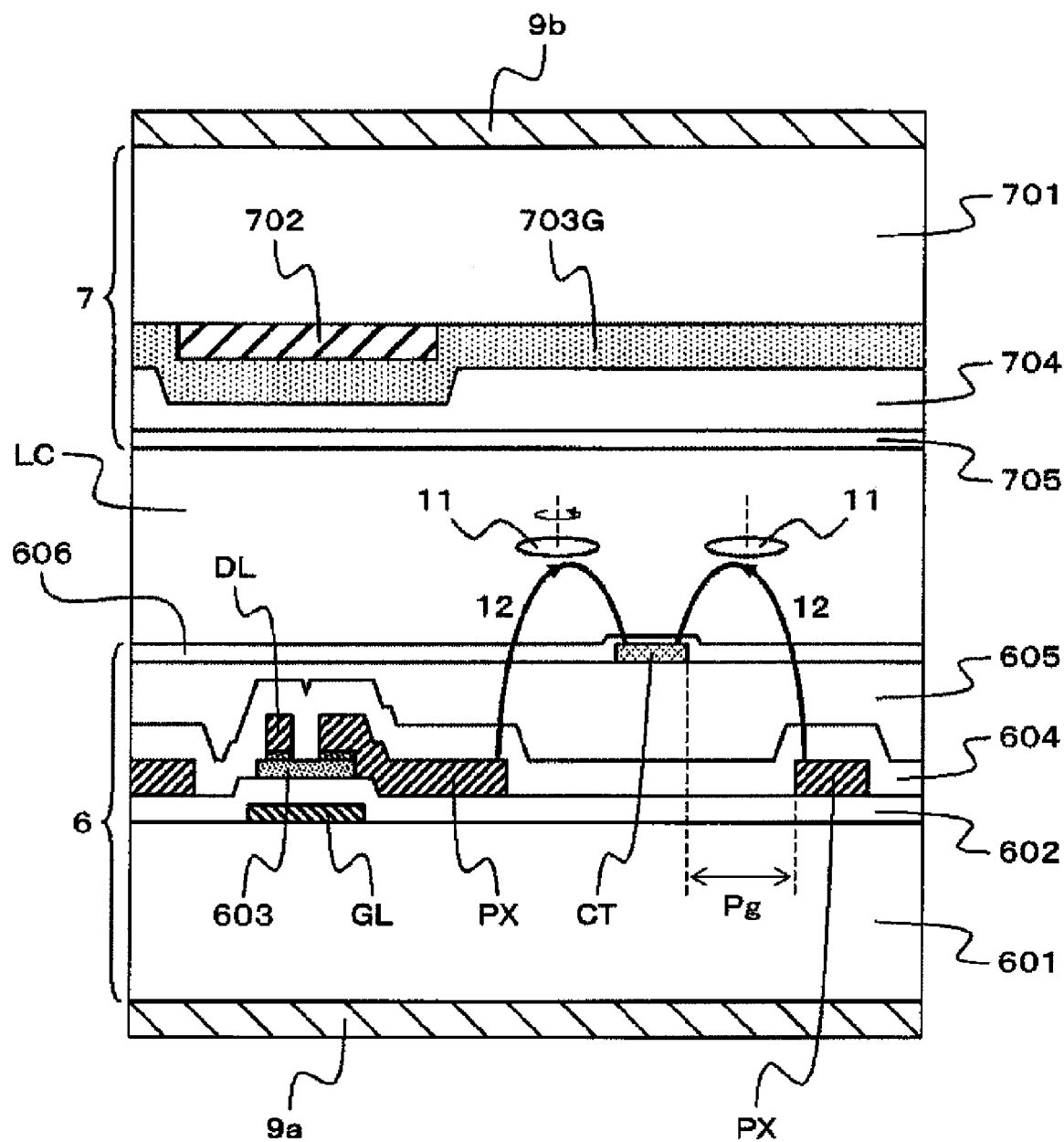
FIG. 2C is a schematic sectional view illustrating an example of a sectional structure cut along the line IIC-IIC of FIG. 2B.
Figure 2D:
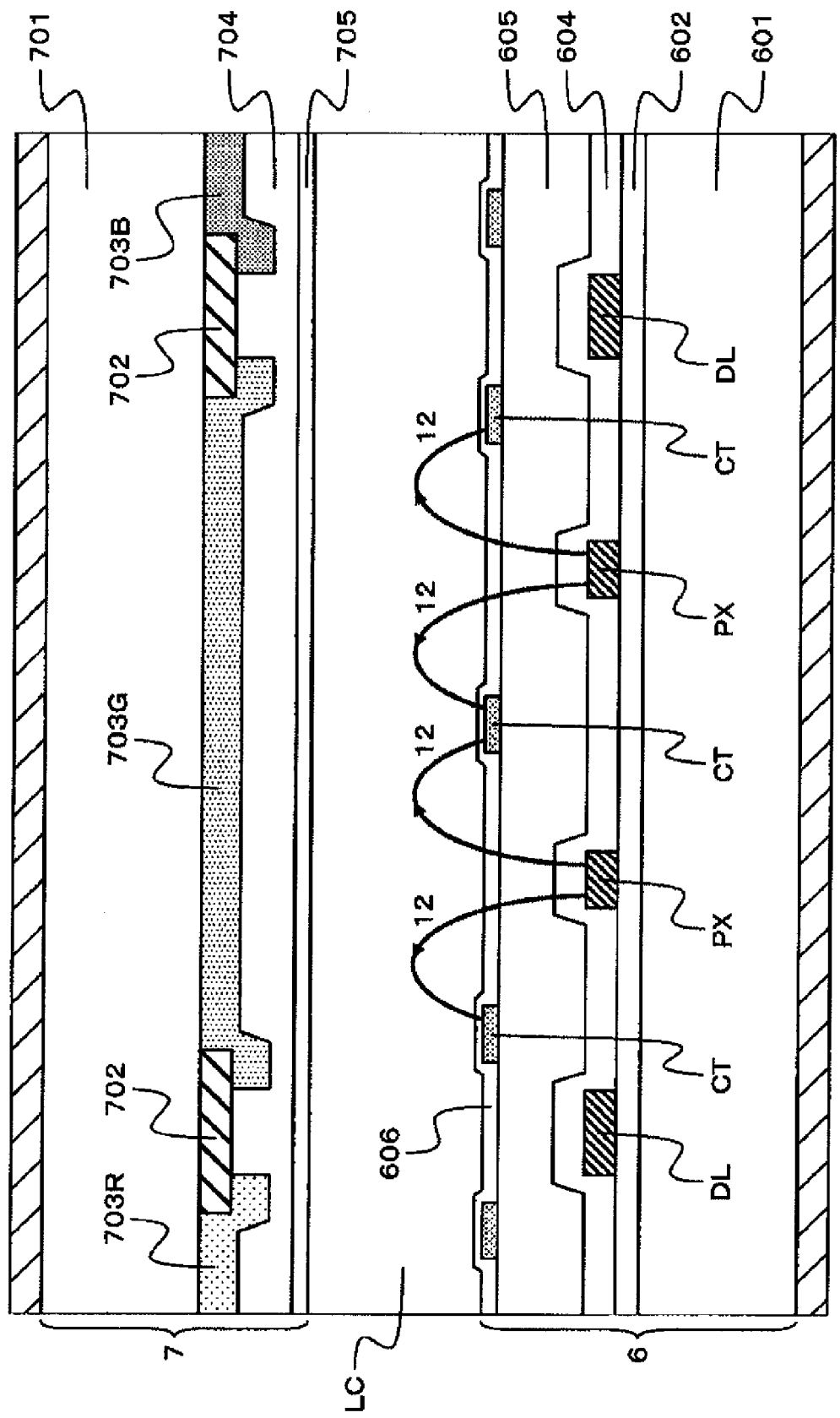
FIG. 2D is a schematic sectional view illustrating an example of a sectional structure cut along the line IID-IID of FIG. 2B.
Figure 2E:
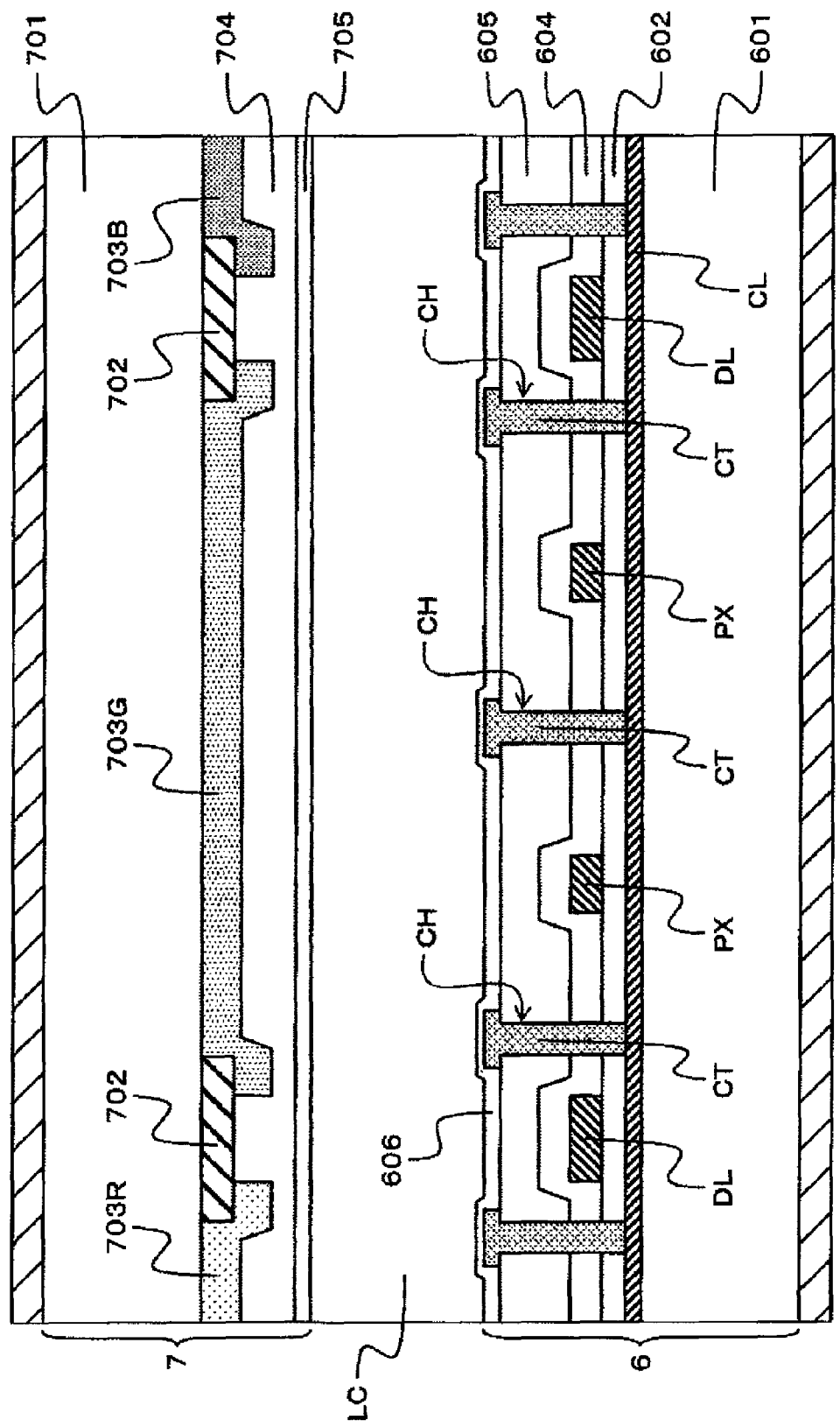
FIG. 2E is a schematic sectional view illustrating an example of a sectional structure cut along the line IIE-IIE of FIG. 2B.

FIG. 2A is a schematic plan view illustrating an example of the planar structure of a single pixel of an active matrix substrate in the liquid crystal display panel of the first embodiment. FIG. 2B is a schematic plan view illustrating an example of the planar structure of the pixel in which a counter substrate is laid on top of an area illustrated in FIG. 2A. FIG. 2C is a schematic sectional view illustrating an example of a sectional structure cut along the line IIC-IIC of FIG. 2B. FIG. 2D is a schematic sectional view illustrating an example of a sectional structure cut along the line IID-IID of FIG. 2B. FIG. 2E is a schematic sectional view illustrating an example of a sectional structure cut along the line IIE-IIE of FIG. 2B. FIG. 2F is a schematic sectional view illustrating an example of a sectional structure cut along the line IIF-IIF of FIG. 2B.

FIG. 2F illustrates only the sectional structures of the liquid crystal layer LC and a part of the active matrix substrate 6 and the counter substrate 7 that is in the vicinity of the liquid crystal layer LC.

The first embodiment takes a lateral field driving liquid crystal display panel as an example of the liquid crystal display panel 1 to which this embodiment mode is applied. A single pixel and its peripheries in the liquid crystal display panel 1 of the first embodiment are structured as illustrated in FIGS. 2A to 2F, for example.

The active matrix substrate 6 is an insulating substrate such as a glass substrate 601 on a surface of which the scanning signal lines GL, the sharing enabling wiring line CL, and a first insulating layer 602 are formed, with the first insulating layer 602 covering the scanning signal lines GL and the sharing enabling wiring line CL.

Formed on the first insulating layer 602 are a semiconductor layer 603 of the TFT device Tr, the video signal lines DL, and the pixel electrode PX, which are covered with a second insulating layer 604. The semiconductor layer 603 is formed above one scanning signal line GL, and a part of the scanning signal line GL that is below the semiconductor layer 603 functions as a gate electrode of the TFT device Tr. The semiconductor layer 603 includes, for example, an active layer (channel forming layer) formed from first amorphous silicon, and a source diffusion layer and drain diffusion layer formed from second amorphous silicon to be laminated on the active layer. The second amorphous silicon differs from the first amorphous silicon in impurity type and impurity concentration. One video signal line DL and the pixel electrode PX partially rest on the semiconductor layer 603, and the parts resting on the semiconductor layer 603 function as a drain electrode and source electrode of the TFT device Tr.

The source and drain of the TFT device Tr are switched in accordance with a bias relation, namely, a high-low relation between the electric potential of the pixel electrode PX and the electric potential of the video signal line DL when the TFT device Tr is turned on. In the following description, however, an electrode connected to the video signal line DL is referred to as drain electrode and an electrode connected to the pixel electrode PX is referred to as source electrode.

A third insulating layer 605 (overcoat layer) having a leveled surface is formed on the second insulating layer 604.

Formed on the third insulating layer 605 are the common electrode CT and an alignment film 606, which covers the common electrode CT. The common electrode CT is connected to the sharing enabling wiring line CL through a contact hole CH (through hole), which passes through the first insulating layer 602, the second insulating layer 604, and the third insulating layer 605. The common electrode CT is formed such that a gap Pg with the pixel electrode PX in the plan view of FIG. 2A is approximately 7 μm. The alignment film 606 in this example is formed from, for example, a polyimide-based resin, and has a surface that has been treated by rubbing.

The counter substrate 7 is an insulating substrate such as a glass substrate 701 on a surface of which a black matrix 702, color filters 703R, 703G, and 7033, and an overcoat layer 704 are formed, with the overcoat layer 704 covering the black matrix 702 and the color filters 703R, 703G, and 703B. The black matrix 702 is, for example, a grid-patterned light-shielding film for providing the display area DA with opening regions on a pixel basis. The color filters 703R, 703G, and 703B are each a film that transmits only light of a specific wavelength range (color) out of white light from the backlight 5 and, when the liquid crystal display device is capable of RGB color display, for example, the color filters 703R, 703G, and 703E arranged in order transmit red light, green light, and blue light, respectively. The overcoat layer 704 has a leveled surface.

The plurality of column spacers 10 and an alignment film 705 are formed on the overcoat layer 704. The column spacers 10 have, for example, a conical frustum shape with a flat top (a body of rotation obtained by rotating a trapezoid). Each column spacer 10 is formed in a place overlapping with a part of one scanning signal line GL on the active matrix substrate 6 that is not where the TFT device Tr is disposed nor where the scanning signal line GL intersects the video signal line DL. The alignment film 705 is formed from, for example, a polyimide-based resin, and has a surface that has been treated by rubbing. The alignment film 705 in this example is formed by, for example, applying or printing a solution that is obtained by dissolving the polyimide-based resin, or a precursor of the polyimide-based resin, in a solvent. Accordingly, when the alignment film 705 is formed after the column spacer 10 approximately 4.2 μm in height, for example, is formed on the overcoat layer 704, the alignment film 705 is much thinner above the top of the column spacer 10 than in other places (where the alignment film 705 is formed directly on the overcoat layer 704).

Liquid crystal molecules 11 of the liquid crystal layer LC in the liquid crystal display panel 1 of the first embodiment are aligned to be substantially parallel to the surfaces of the glass substrates 601 and 701 during no-electric field application in which the pixel electrode PX and the common electrode CT have an equal electric potential, and are homogeneously aligned in an initial alignment direction which is determined by the rubbing performed on the alignment films 606 and 705.

When the TFT device Tr is turned on to write a gray scale voltage applied to the video signal line DL in the pixel electrode PX and an electric potential difference is generated between the pixel electrode PX and the common electrode CT as a result, an electric field 12 (electric flux lines) as illustrated in FIG. 2C is generated and applied to the liquid crystal molecules 11. The intensity of the applied electric field 12 is dependent on the electric potential difference between the pixel electrode PX and the common electrode CT. Upon application, an interaction between the dielectric anisotropy of the liquid crystal layer LC and the electric field 12 changes the orientation of the liquid crystal molecules 11 constituting the liquid crystal layer LC to the direction of the electric field 12, thereby changing the refractive anisotropy of the liquid crystal layer LC. The orientation of the liquid crystal molecules 11 is determined by the intensity of the electric field 12 applied (the magnitude of the electric potential difference between the pixel electrode PX and the common electrode CT). The liquid crystal display device may therefore display an animation or an image by, for example, performing a pixel-based control of the gray scale voltage to be applied to the pixel electrode PX and thus changing the light transmittance in individual pixels while fixing the electric potential of the common electrode CT.

The description now returns to the structure of the active matrix substrate 6 to describe the structure of the column spacer receiving portions of the active matrix substrate 6 in the liquid crystal display panel 1 of the first embodiment, in other words, portions of the active matrix substrate 6 that are opposed to the column spacers 10.

The active matrix substrate 6 in the liquid crystal display panel 1 of the first embodiment includes a column spacer receiving member 13 disposed in each column spacer receiving portion as illustrated in FIGS. 2A and 2F, for example. The column spacer receiving member 13 is made of a material different from that of the alignment film 606 and the third insulating layer 605, which is formed below the alignment film 606. The column spacer receiving member 13 is formed from, for example, a transparent conductor such as indium-tin oxide (ITO). This makes the alignment film 606 much thinner above the column spacer receiving member 13 than in places where the alignment film 606 is formed directly on the third insulating layer 605 when the alignment film 606 is formed on the third insulating layer 605 by the method described below. A part of each of the alignment films 606 and 705 that is interposed between the top of the column spacer 10 and the column spacer receiving member 13 is therefore made very thin by, for example, giving the column spacer receiving member 13 larger planar dimensions than the dimensions of the top of the column spacer 10 as illustrated in FIG. 2F. A liquid crystal display device including the liquid crystal display panel 1 of the first embodiment may thus prevent minute bright spots caused by, for example, the flaking of the part of each of the alignment films 606 and 705 that is interposed between the column spacer 10 and the column spacer receiving member 13.

An example of a method of manufacturing the liquid crystal display panel 1 according to the first embodiment is described below. The method of manufacturing the liquid crystal display panel 1 of the first embodiment includes some steps which may be executed by the same procedure as in a conventional liquid crystal display panel manufacturing method, and a detailed description on those steps is omitted.

The method of manufacturing the liquid crystal display panel 1 of the first embodiment is roughly broken into three steps: a step of forming the active matrix substrate 6; a step of forming the counter substrate 7; and a step of bonding the active matrix substrate 6 and the counter substrate 7 together to enclose a liquid crystal material (liquid crystal layer LC).

The step of forming the active matrix substrate 6 uses the glass substrate 601 with a polished surface which has a thickness of 0.7 mm, for example. First, the scanning signal lines GL and the sharing enabling wiring line CL are formed on the surface of the glass substrate 601. The scanning signal lines GL and the sharing enabling wiring line CL are formed by, for example, forming a metal film such as a chromium film (Cr film) on the entire surface of the glass substrate 601 and etching the metal film.

Next, the first insulating layer 602 is formed. The first insulating layer 602 is formed by, for example, forming a silicon nitride film to a thickness of about 0.3 μm on the entire surface of the glass substrate 601.

An insular semiconductor film is formed next to be used as the semiconductor layer 603 of the TFT device Tr. The insular semiconductor film is formed by, for example, forming an amorphous silicon film on the entire surface of the first insulating layer 602 and etching the amorphous silicon film. The amorphous silicon film has, for example, a laminated structure in which a first amorphous silicon layer is topped with a second amorphous silicon layer different from the first amorphous silicon layer in conductivity type or in impurity type or impurity concentration. Other layers including a short-circuit preventing layer, which is interposed between one scanning signal line GL and one video signal line DL in an area where the signal lines GL and DL intersect each other, are formed at the same the insular semiconductor film is formed.

The video signal lines DL and the pixel electrode PX are formed next. The video signal lines DL and the pixel electrode PX are formed by, for example, forming a metal film such as a chromium film on the first insulating layer 602 and etching the metal film. The etching is performed so as to shape the video signal lines DL such that a portion of each video signal line DL rests on the insular semiconductor film, in other words, a portion of each video signal line DL functions as the drain electrode of the TFT device Tr. The etching is also performed so as to shape the pixel electrode PX such that a portion of the pixel electrode PX rests on the insular semiconductor film, in other words, a portion of the pixel electrode PX functions as the source electrode of the TFT device Tr.

Next, with the video signal lines DL and the pixel electrode PX as a mask, the second amorphous silicon layer of the insular semiconductor film is etched to be divided into a drain diffusion layer and a source diffusion layer. The semiconductor layer 603 of the TFT device Tr is thus obtained.

The second insulating layer 604 and the third insulating layer 605 are formed next. The second insulating layer 604 is formed from, for example, a silicon nitride film approximately 0.3 μm in thickness. The third insulating layer 605 is formed by, for example, applying an uncured acrylic-based resin and then curing the resin under given conditions such as heating at a temperature of 220° C. for an hour. Alternatively, the third insulating layer 605 may be formed from a heat-curable resin that has excellent insulative properties and transparency, such as epoxy acrylic-based resin or polyimide-based resin. Still alternatively, the third insulating layer 605 may be formed from a photo-curable transparent resin or from an inorganic material such as polysiloxane-based resin.

Next, the contact hole CH passing through the first insulating layer 602, the second insulating layer 604, and the third insulating layer 605 is formed above a given area of the sharing enabling wiring line CL. The contact hole CH is formed by etching the first insulating layer 602, the second insulating layer 604, and the third insulating layer 605.

The common electrode CT and the column spacer receiving member 13 are formed next. The common electrode CT and the column spacer receiving member 13 are formed by, for example, forming a transparent conductive film such as an ITO film on the third insulating layer 605 to a thickness of about 70 nm and etching the transparent conductive film. The column spacer receiving member 13 is shaped to be, for example, circular in plan view as illustrated in FIG. 2A.

Formed next is the alignment film 606. The alignment film 606 is formed by, for example, applying a solution that is obtained by dissolving a polyimide resin, or a precursor of the polyimide resin, in a given solvent (this or similar solution is referred to as alignment film varnish), vaporizing the solvent through heating under given conditions, and performing rubbing on the resultant coat.

Alignment film varnish that is used to form an alignment film in a conventional method of manufacturing a common liquid crystal display panel has low wettability with respect to a transparent conductive film such as an ITO film. Therefore, with the column spacer receiving member 13 which is made of ITO formed in the column spacer receiving portion, it is difficult for the alignment film varnish to wet and spread over a stepped edge portion created from the third insulating layer 605 and the rim of the column spacer receiving member 13. Shaping the column spacer receiving member 13 into a circular or other non-angular shape in plan view causes the alignment film varnish that is applied to the column spacer receiving member 13 to flow over the stepped edge portion outward. The alignment film varnish applied to the third insulating layer 605 is therefore sufficiently thinner above the column spacer receiving member 13 than in places around the column spacer receiving member 13 (e.g., places where the alignment film varnish is applied directly to the third insulating layer 605), or has an opening that exposes the column spacer receiving member 13. As a result, the alignment film 606 of the active matrix substrate 6 in the liquid crystal display panel 1 of the first embodiment is sufficiently thinner above the column spacer receiving member 13 than in places around the column spacer receiving member 13 (e.g., places where the alignment film 606 is formed directly on the third insulating layer 605), or has an opening that exposes the column spacer receiving member 13.

The inventors of the present invention have prepared alignment film varnish obtained by blending polyamide acid, N-methyl-2-pyrrolidone (NMP), γ-butyrolactone (GBL), and butyl cellosolve (BC) at a weight ratio of 6:20:54:20. The alignment film varnish has been applied by flexographic printing, dried at 70° C., and then continuously heated (baked) at 220° C. for thirty minutes to form the alignment film 606. The obtained alignment film 606 is approximately 100 nm in thickness in the places where the alignment film 606 is formed directly on the third insulating layer 605, approximately 15 nm in thickness above the common electrode CT, and approximately 10 nm in thickness above the column spacer receiving member 13.

In the liquid crystal display panel 1 of the first embodiment, the thickness of the alignment film 606 in the column spacer receiving portion may thus be made equal to or smaller than approximately ⅓, or preferably approximately 1/10 of the thickness of the alignment film 606 in the places where the alignment film 606 is formed directly on the third insulating layer 605 by disposing the column spacer receiving member 13 which is made of ITO in the column spacer receiving portion of the active matrix substrate 6.

The counter substrate 7 of the liquid crystal display panel 1 of the first embodiment may be formed by a conventional procedure, and therefore a description on the step of forming the counter substrate 7 is omitted here. The inventors of the present invention have formed the column spacer 10 approximately 4.2 µm in height on the overcoat layer 704, and then formed the alignment film 705 of the counter substrate 7 by the same procedure used to form the alignment film 606 of the active matrix substrate 6. The obtained alignment film 705 is approximately 100 nm in thickness in an opening area (area above the color filter) and approximately 5 nm in thickness above the top of the column spacer 10.

The step of bonding together the active matrix substrate 6 and the counter substrate 7 which have been formed by the procedure described above to enclose a liquid crystal material includes, for example, forming the ring-like sealant 8 by application in the perimeter of the display area DA of the counter substrate 7, dripping the liquid crystal material in an area that is surrounded by the sealant 8, and bonding the active matrix substrate 6 to the counter substrate 7. The substrates are bonded with the alignment direction (rubbing direction) of the alignment film 606 on the active matrix substrate 6 and the alignment direction of the alignment film 705 on the counter substrate 7 kept substantially parallel to each other. The liquid crystal material used here is a nematic liquid crystal composition A, which has, for example, a positive dielectric anisotropy $\Delta\in$ at a value of 10.2 (1 kHz, 20° C.), a refractive anisotropy $\Delta n$ of 0.075 (wavelength: 590 nm, 20° C.), a twist elastic constant K2 of 7.0 pN, and a nematic-isotropic phase transition temperature T (N−1) of about 76° C. The active matrix substrate 6 and the counter substrate 7 are bonded with the thickness of the liquid crystal layer LC (cell gap) set to a value that is substantially the same as the height of the column spacers 10, for example, 4.2 µm.

The retardation ($\Delta n \cdot d$) of the liquid crystal display panel 1 manufactured by the procedure described above is approximately 0.31 µm. The retardation $\Delta n \cdot d$ desirably satisfies $0.2 \mu m \leq \Delta n \cdot d \leq 0.5 \mu m$, and a retardation value outside this range causes such problems as the presence of unintended colors in an image that is to be displayed in white.

A procedure subsequent to the sealing of the liquid crystal material between the bonded active matrix substrate 6 and counter substrate 7 is, for example, cutting off and removing an unnecessary portion (margin) along the perimeter of the glass substrates 601 and 701 and bonding the polarizing plates 9a and 9b together. In bonding the polarizing plates 9a and 9b, the polarization transmission axis of one of the polarizing plates, 9a, is set substantially parallel to the alignment direction of the alignment film 606 on the active matrix substrate 6 and the alignment direction of the alignment film 705 on the counter substrate 7, and the polarization transmission axis of the other one of the polarizing plates, 9b, is set orthogonal to that of the polarizing plate 9a. Thereafter, the first driver circuit 2, the second driver circuit 3, the control circuit 4, the backlight 5, and other components are connected to operate as modules, whereby a liquid crystal display device that includes the liquid crystal display panel 1 of the first embodiment is obtained. The liquid crystal display panel 1 of the first embodiment has normally-closed characteristics (also called normally-black characteristics) which cause the liquid crystal display panel 1 to display a dark screen (to display at a low luminance) when the electric potential difference between the pixel electrode PX and the common electrode CT is small, and to display a bright screen (to display at a high luminance) when the electric potential difference between the pixel electrode PX and the common electrode CT is large.

The inventors of the present invention have conducted a vibration test on the liquid crystal display device that includes the liquid crystal display panel 1 of the first embodiment. No minute bright spots have been found in the tested liquid crystal display device.

In the vibration test mentioned above, the liquid crystal display device has been fixed to a vibration testing system and, in this state, the vibration testing system has been moved in an out-of-plane direction of the liquid crystal display device (the normal line direction of the surfaces of the glass substrates 601 and 701) to vibrate the liquid crystal display panel 1. The vibration test has re-created vibrations that are generated during, for example, the transportation of the liquid crystal display device by applying sine vibration having a vibration frequency which is modulated (swept) from 50 Hz to 100 Hz in five minutes, at an acceleration of 1.0 G for thirty minutes.

FIG. 3 is a schematic sectional view illustrating an example of the schematic structure of a liquid crystal display panel that is used for comparison with the liquid crystal display panel of the first embodiment.

In order to check the effects of the liquid crystal display panel 1 of the first embodiment, the inventors of the present invention have made a liquid crystal display panel that includes no column spacer receiving member 13 as illustrated in, for example, FIG. 3 and conducted a vibration test on the liquid crystal display panel under the conditions given above. As a result, many minute bright spots have been observed in the tested liquid crystal display device. The liquid crystal display panel of FIG. 3 is the same as the liquid crystal display panel 1 of the first embodiment except that no column spacer receiving member 13 is provided.

When the column spacer receiving member 13 is not provided in the column spacer receiving portion of the active matrix substrate 6, namely, an area opposed to the top of the column spacer 10, alignment film varnish applied to the column spacer receiving portion does not flow over to the outside of the column spacer receiving portion. Accordingly, in the case of the active matrix substrate 6 that includes no column spacer receiving member 13, the alignment film 606 in the column spacer receiving portion has a thickness of, for example, approximately 100 nm, which is much thicker than when the active matrix substrate 6 includes the column spacer receiving member 13. As a result, more of the alignment film 606 is flaked by vibrations in the column spacer receiving portion and individual flakes of the alignment film 606 increase in size (volume), thus increasing the chance of minute bright spots.

The liquid crystal display panel 1 of the first embodiment includes, on the other hand, the column spacer receiving member 13 which is made of ITO and has a circular shape in plan view in the column spacer receiving portion of the active matrix substrate 6. The alignment film 606 on the column spacer receiving member 13 is therefore much thinner than the alignment film in the column spacer receiving portion of the conventional active matrix substrate. In addition, the alignment film 705 on the top of the column spacer 10 of the counter substrate 7 is similarly much thinner than the thickness thereof in the opening area. In this case, the column spacer receiving member 13 is given larger planar dimensions than those of the top of the column spacer 10 as illustrated in, for example, FIG. 2F to make the part of each of the alignment films 606 and 705 that is interposed between the top of the column spacer 10 and the column spacer receiving member 13 very thin overall.

The liquid crystal display panel 1 of the first embodiment is thus reduced in amount of the alignment film 606 chipped by vibrations in the column spacer receiving portion as well as in size (volume) of individual flakes of the alignment film 606, and has less chance of minute bright spots. It is therefore concluded that making the part of each of the alignment films 606 and 705 that is interposed between the top of the column spacer 10 and the column spacer receiving member 13 thinner prevents minute bright spots which are caused by the flaking of the alignment films more successfully, and is preferable in the liquid crystal display panel 1 of the first embodiment.

As has been described, a liquid crystal display device that includes the liquid crystal display panel 1 of the first embodiment may avoid minute bright spots caused by the flaking of the part of each of the alignment films 606 and 705 that is interposed between the top of the column spacer 10 and the column spacer receiving member 13 due to vibrations applied during transportation or the like. This allows the liquid crystal display device that includes the liquid crystal display panel 1 of the first embodiment to, for example, lower the luminance of a part that is displayed in black color, and to improve the white/black contrast ratio accordingly.

The shape of the column spacer receiving member 13 in plan view is not limited to the circular shape illustrated in FIG. 2A, and may be an oval shape, for example. The column spacer receiving member 13 may also have other shapes (e.g. polygonal shape) in plan view than a circular shape and an oval shape. However, when the column spacer receiving member 13 has an angular shape in plan view, the chance is high that alignment film varnish wetting and spreading floods the column spacer receiving member 13 from its corners, thus remaining thick on the column spacer receiving member 13. It is therefore desirable for the column spacer receiving member 13 to have a non-angular shape in plan view.

The column spacer receiving member 13 in the liquid crystal display panel 1 of the first embodiment may be formed from other materials than ITO, for example, a transparent conductor such as indium-zinc oxide (IZO), indium-tin-zinc oxide (ITZO), zinc oxide (ZnO), or tin oxide ($Sn_2O$). These transparent conductors are low in surface energy and tend to repel alignment film varnish. Forming the column spacer receiving member 13 from a transparent conductor as those listed above therefore makes alignment film varnish that remains on the column spacer receiving member 13 after application very thin. In the case where a column spacer receiving member is positioned to overlap with a black matrix as in the liquid crystal display panel 1 of the first embodiment, the column spacer receiving member does not need to be transparent. Therefore, the column spacer receiving member 13 may be formed from other low-surface energy materials than the transparent conductive film described above.

In the case where the common electrode CT is formed from a transparent conductor such as ITO on the third insulating layer 605 of the active matrix substrate 6 as in the liquid crystal display panel 1 of the first embodiment, forming the column spacer receiving member 13 at the same time as the common electrode CT keeps the number of process steps for forming the active matrix substrate 6 from increasing, and prevents a rise in manufacture cost of the liquid crystal display panel 1.

The composition (the types and blend ratio of solute and solvent) of the alignment film varnish may be modified to suit individual purposes. Changing the composition of the alignment film varnish may change the wettability with respect to the column spacer receiving member 13. It is therefore an available option to change the combination of the material of the column spacer receiving member 13 and the composition of the alignment film varnish such that an opening is formed above the column spacer receiving member 13 upon application of the alignment film varnish. In this case, the alignment film 606 of the active matrix substrate 6 has an opening in the column spacer receiving portion, and hence the obtained liquid crystal display panel 1 has only the alignment film 705 of the counter substrate 7 between the top of the column spacer 10 and the column spacer receiving member 13, or the top of the column spacer 10 and the column spacer receiving member 13 are in direct contact with each other in the obtained liquid crystal display panel 1. A liquid crystal display device including this liquid crystal display panel 1 has even less chance of minute bright spots which are caused by the flaking of the alignment films 606 and 705.

The first embodiment takes as an example the lateral field driving liquid crystal display panel 1 that has pixels structured as illustrated in FIGS. 2A to 2F. However, the pixel structure (e.g., the shapes of the TFT device Tr, the pixel electrode PX, and the common electrode CT in plan view (planar layout)) is not limited to the one illustrated in FIGS. 2A to 2F and may be modified to suit individual purposes. The TFT device Tr of FIGS. 2A and 2C has a bottom gate structure in which the semiconductor layer 603 is formed above the scanning signal lines GL, but may instead have a top gate structure in which the semiconductor layer 603 is formed between the glass substrate 601 and the scanning signal lines GL.

Further, in the liquid crystal display panel 1 of the first embodiment, the column spacer 10 is formed on the counter substrate 7 and the column spacer receiving member 13 is formed on the active matrix substrate 6. However, the present invention is not limited thereto. The column spacer 10 may be formed on the active matrix substrate 6 and the column spacer receiving member 13 may be formed on the counter substrate 7.

[Second Embodiment]

FIGS. 4A to 4D are schematic diagrams illustrating an example of the schematic structure of a liquid crystal display panel according to a second embodiment of the present invention.

Figure 4A:
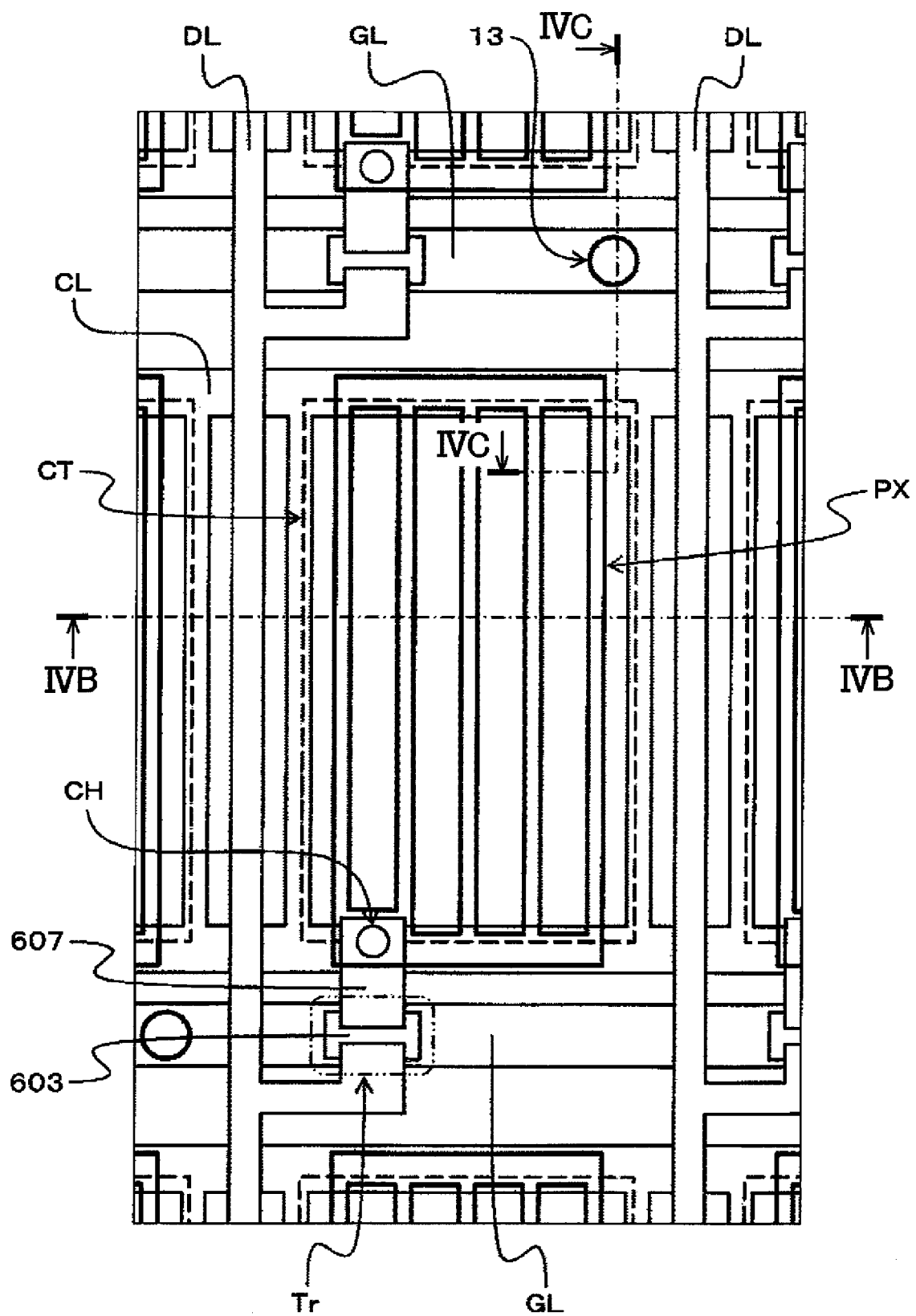
FIG. 4A is a schematic plan view illustrating an example of a planar structure of a single pixel of an active matrix substrate in a liquid crystal display panel according to a second embodiment of the present invention.
Figure 4C:
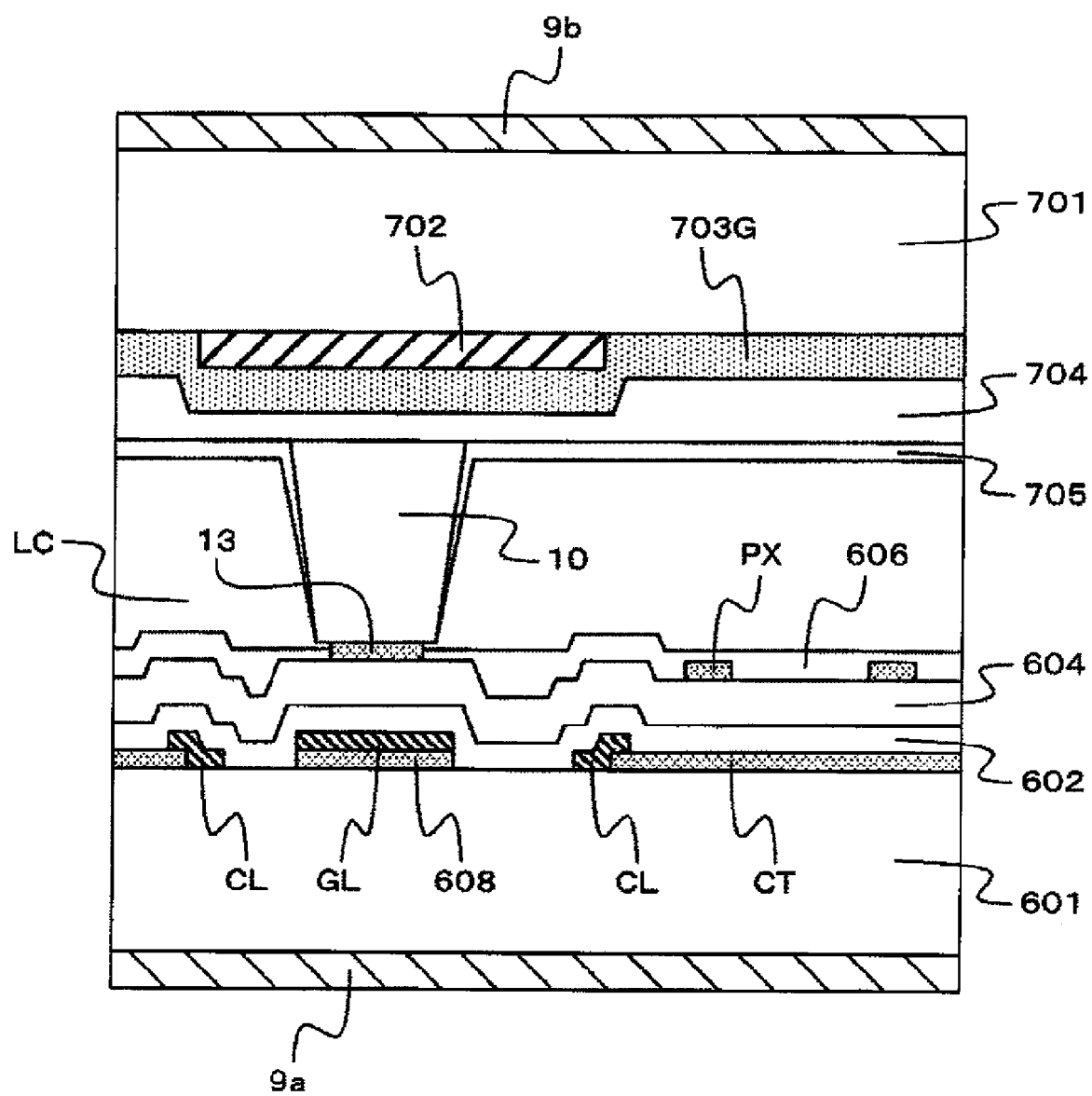
FIG. 4C is a schematic sectional view illustrating an example of a sectional structure cut along the line IVC-IVC of FIG. 4A.
Figure 4D:
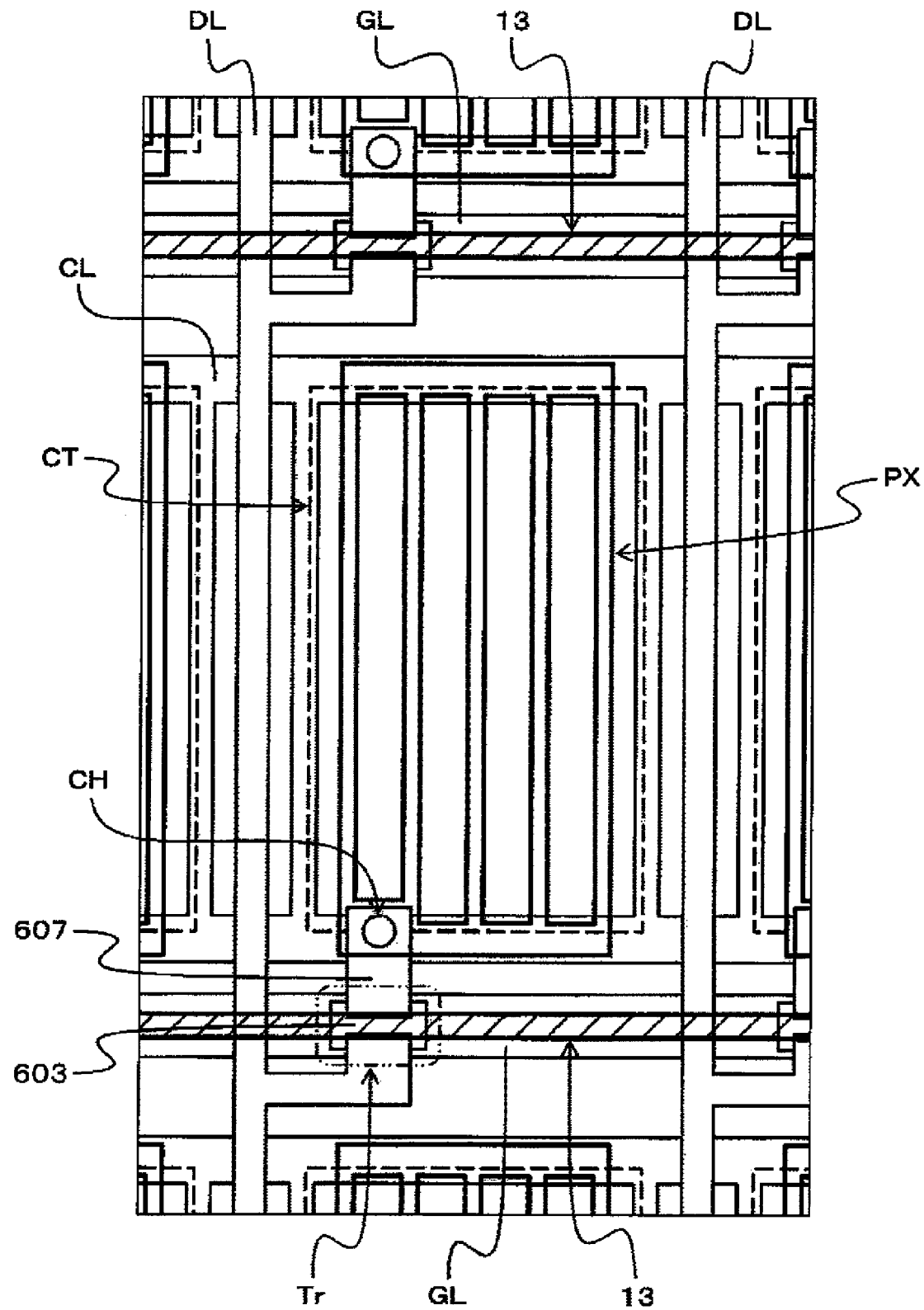
FIG. 4D is a schematic plan view illustrating another example of the planar structure of the single pixel of the active matrix substrate in the liquid crystal display panel according to the second embodiment.

FIG. 4A is a schematic plan view illustrating an example of the planar structure of a single pixel of an active matrix substrate in the liquid crystal display panel of the second embodiment. FIG. 4B is a schematic sectional view illustrating an example of a sectional structure cut along the line IVB-IVB of FIG. 4A. FIG. 4C is a schematic sectional view illustrating an example of a sectional structure cut along the line IVC-IVC of FIG. 4A. FIG. 4D is a schematic plan view illustrating another example of the planar structure of a single pixel of the active matrix substrate in the liquid crystal display panel of the second embodiment.

FIGS. 4B and 4C also illustrate the liquid crystal layer LC (liquid crystal material) and the counter substrate 7 which are above the active matrix substrate 6.

The second embodiment takes a lateral field driving liquid crystal display panel as an example of the liquid crystal display panel 1 to which this embodiment mode is applied. The second embodiment describes a case where a single pixel and its peripheries in the liquid crystal display panel 1 are structured as illustrated in FIGS. 4A to 4C.

The active matrix substrate 6 is an insulating substrate such as the glass substrate 601 on a surface of which the common electrode CT, the scanning signal lines GL, the sharing enabling wiring line CL, and the first insulating layer 602 are formed, with the first insulating layer 602 covering the common electrode CT, the scanning signal lines GL, and the sharing enabling wiring line CL.

Formed on the first insulating layer 602 are the semiconductor layer 603 of the TFT device Tr, the video signal lines DL, and the source electrode 607, which are covered with the second insulating layer 604. One video signal line DL and the source electrode 607 partially rest on the semiconductor layer 603, and the parts resting on the semiconductor layer 603 function as a drain electrode and source electrode of the TFT device Tr.

In the liquid crystal display panel 1 of the second embodiment, the third insulating layer 605 is not formed, and the pixel electrode PX and the alignment film 606, which covers the pixel electrode PX, are formed on the second insulating layer 604. The pixel electrode PX is connected to the source electrode 607 through the contact hole CH (through hole) that passes through the second insulating layer 604.

The common electrode CT formed on the surface of the glass substrate 601 has a flat shape and located in an area surrounded by two adjacent scanning signal lines GL and two adjacent video signal lines DL (opening area). The pixel electrode PX that has a plurality of slits (four slits in FIG. 4A) is laid on top of the flat common electrode CT. The common electrodes CT of pixels that are side by side in the running direction of the scanning signal lines GL are made common by the sharing enabling wiring line CL.

The counter substrate 7 in the liquid crystal display panel 1 of the second embodiment has the same structure as that of the counter substrate 7 in the liquid crystal display panel 1 of the first embodiment. A detailed description on the structure of the counter substrate 7 is therefore omitted here.

The description now returns to the structure of the active matrix substrate 6 to describe the structure of the column spacer receiving portions, in other words, portions that are opposed to the column spacers 10 of the active matrix substrate 6 in the liquid crystal display panel 1 of the second embodiment.

The active matrix substrate 6 in the liquid crystal display panel 1 of the second embodiment includes the column spacer receiving member 13 disposed in each column spacer receiving portion as illustrated in FIGS. 4A and 4C, for example. The column spacer receiving member 13 is made of a material different from that of the alignment film 606 and the second insulating layer 604, which is formed below the alignment film 606. The column spacer receiving member 13 is formed from the same material that is used in the pixel electrode PX, for example, a transparent conductor such as ITO. Further, the column spacer receiving member 13 is shaped to have, for example, a circular or other non-angular shape in plan view of FIG. 4A. The column spacer receiving member 13 and the column spacer 10 are in direct contact with each other in the sectional structure illustrated in FIG. 4C. However, the structure is not limited thereto, and the alignment films 606 and 705 having a thickness of a few nm may be interposed between the column spacer receiving member 13 and the column spacer 10.

The active matrix substrate 6 in the liquid crystal display panel 1 of the second embodiment also includes a conductive layer 608 interposed between the glass substrate 601 and the scanning signal lines GL as illustrated in FIG. 4C, for example. The conductive layer 608 is formed from the same material as that of the common electrode CT (for example, ITO). When a deposition method such as CVD is used to form the first insulating layer 602 and the second insulating layer 604, the second insulating layer 604 has surface irregularities that correspond to the shapes in plan view and thicknesses of the scanning signal lines GL, the common electrode CT, and the sharing enabling wiring line CL. This makes the distance from the surface of the glass substrate 601 to the column spacer receiving member 13 larger than the distance from the surface of the glass substrate 601 to the pixel electrode PX.

In forming the active matrix substrate 6 of the liquid crystal display panel 1 of the second embodiment, the common electrode CT, the scanning signal lines GL, and the sharing enabling wiring line CL are formed first on a surface of the glass substrate 601. The common electrode CT is formed by, for example, forming an ITO film with a thickness of about 0.05 μm and etching the ITO film. The scanning signal lines GL and the sharing enabling wiring line CL are formed by, for example, forming a chromium film with a thickness of about 0.4 μm, and etching the chromium film.

When the above-mentioned procedure is used to form the common electrode CT and to form the scanning signal lines GL and the sharing enabling wiring line CL, the conductive layer 608 interposed between the glass substrate 601 and the scanning signal lines GL along with the common electrode CT is desirably formed at the time the ITO film is etched. However, the conductive layer 608 may be omitted when the thickness of the common electrode CT is sufficiently thinner than that of the scanning signal lines GL as in the case described above.

FIGS. 4B and 4C illustrate a sectional structure that is obtained when the scanning signal lines GL and the sharing enabling wiring line CL are formed by forming and etching the chromium film after the common electrode CT is formed by etching the ITO film. However, other procedures than this may be used to form the common electrode CT and to form the scanning signal lines GL and the sharing enabling wiring line CL. For instance, the ITO film and the chromium film may be formed in succession, followed by the etching of the chromium film and the ITO film to form the common electrode CT and the conductive layer 608, and subsequently the etching of the chromium film alone to form the scanning signal lines GL and the sharing enabling wiring line CL.

Next, the first insulating layer 602 is formed. The first insulating layer 602 is formed from, for example, a silicon nitride film with a thickness of about 0.2 μm. Usually, a deposition method such as CVD is used to form the first insulating layer 602. Therefore, level differences (surface irregularities) reflecting the shapes in plan view and thicknesses of the scanning signal lines GL, the common electrode CT, and the sharing enabling wiring line CL are created in the surface of the first insulating layer 602 as a result.

Formed next are the semiconductor layer 603 of the TFT device Tr, the video signal lines DL, and the source electrode 607. The semiconductor layer 603, the video signal lines DL, and the source electrode 607 may be formed by the same procedure as the procedure of forming the semiconductor layer 603, the video signal lines DL, and the pixel electrode PX which has been described in the first embodiment. Specifically, an insular semiconductor film in which a first amorphous silicon layer and a second amorphous silicon layer are laminated is formed, then a chromium film is formed and etched to form the video signal lines DL and the source electrode 607, and subsequently the second amorphous silicon layer of the insular semiconductor film is etched to form the semiconductor layer 603.

Next, the second insulating layer 604 is formed. The second insulating layer 604 is formed from, for example, a silicon nitride film with a thickness of about 0.3 μm. Usually, a deposition method such as CVD is used to form the second insulating layer 604. Level differences (surface irregularities) are therefore created in the surface of the second insulating layer 604 which reflect the surface irregularities of the first insulating layer 602 and the shapes in plan view and thicknesses of the semiconductor layer 603, the video signal lines DL, and the source electrode 607. The level differences in the second insulating layer 604 include a concavity (concave portion) created along the running direction of the scanning signal lines GL between each scanning signal line GL and each sharing enabling wiring line CL (common electrode CT).

Next, a contact hole passing through the second insulating layer 604 is formed above a predetermined area of the source electrode 607.

Next, the pixel electrode PX and the column spacer receiving member 13 are formed. The pixel electrode PX and the column spacer receiving member 13 are formed by, for example, forming an ITO film with a thickness of about 0.05 μm and etching the ITO film. At this time, the pixel electrode PX is shaped to have a plurality of slits in plan view, and the column spacer receiving member 13 is shaped to have a circular, oval, or other non-angular shape in plan view.

Formed next is the alignment film 606. The alignment film 606 is formed by, for example, applying a solution that is obtained by dissolving polyimide resin, or a precursor of the polyimide resin, in a predetermined solvent (this or similar solution is referred to as alignment film varnish), vaporizing the solvent through heating under predetermined conditions, and performing rubbing on the resultant coat.

With the column spacer receiving member 13 which is made of ITO formed in the column spacer receiving portion, it is difficult for the alignment film varnish to wet and spread over a stepped edge portion created from the second insulating layer 604 and the rim of the column spacer receiving member 13. Shaping the column spacer receiving member 13 into a circular, oval, or other non-angular shape in plan view causes the alignment film varnish that is applied to the column spacer receiving member 13 to flow over the stepped edge portion outward when the alignment film varnish is applied. Further, in the case where the second insulating layer 604 has surface irregularities (on a surface where the pixel electrode PX and the column spacer receiving member 13 are formed) and there is a concavity (concave portion) around the column spacer receiving portion as in the active matrix substrate 6 of the second embodiment, the alignment film varnish that is applied to the column spacer receiving portion flows into and accumulate in the concavity (concave portion). Consequently, applying the alignment film varnish to the second insulating layer 604 leaves a very thin coat of the alignment film varnish on the column spacer receiving member 13.

The inventors of the present invention have prepared alignment film varnish obtained by blending polyamide acid, N-methyl-2-pyrrolidone (NMP), γ-butyrolactone (GBL), and butyl cellosolve (BC) at a weight ratio of 6:20:54:20. The alignment film varnish has been printed (applied) by ink jet printing, dried at 70° C., and then continuously heated (baked) at 220° C. for thirty minutes to form the alignment film 606. The obtained alignment film 606 is approximately 100 nm in thickness in an opening area where the alignment film 606 is formed directly on the second insulating layer 604, approximately 40 nm in thickness above the pixel electrode PX, and approximately 20 nm in thickness above the column spacer receiving member 13.

In the liquid crystal display panel 1 of the second embodiment, the thickness of the alignment film 606 in the column spacer receiving portion may thus be made approximately ⅕ of the thickness of the alignment film 606 in a part of the display area where the alignment film 606 is formed directly on the second insulating layer 604 by disposing the column spacer receiving member 13 which is made of ITO in the column spacer receiving portion of the active matrix substrate 6.

The counter substrate 7 of the liquid crystal display panel 1 of the second embodiment may be formed by a conventional procedure, and therefore a description on the step of forming the counter substrate 7 is omitted here. The inventors of the present invention have formed the column spacer 10 approximately 4.2 μm in height on the overcoat layer 704, and then formed the alignment film 705 of the counter substrate 7 by the same procedure used to form the alignment film 606 of the active matrix substrate 6. The obtained alignment film 705 is approximately 100 nm in thickness in an opening area (where the alignment film 705 is formed directly on the color filter) and approximately 5 nm above the top of the column spacer 10.

The inventors of the present invention have conducted a vibration test on the liquid crystal display device that includes the liquid crystal display panel 1 of the second embodiment under the conditions given in the first embodiment. No minute bright spots have been found in the tested liquid crystal display device.

The column spacer receiving member 13 is not limited to the circular shape illustrated in FIG. 4A and, for example, may have a linear shape as the one illustrated in FIG. 4D. The linearly shaped column spacer receiving member 13 in FIG. 4D stretches over a hatched portion of the drawing. Similarly to the circular shape column spacer receiving member 13, the linearly shaped column spacer receiving member 13 may be formed from an ITO film that has a thickness of about 0.05 μm and that constitutes the topmost layer of the active matrix substrate 6. For example, one linearly shaped column spacer receiving member 13 may be formed along each scanning signal line GL, so that strips of the column spacer receiving members 13 are formed over the entire length and width of the active matrix substrate 6.

The inventors of the present invention have formed the linearly shaped column spacer receiving member 13 by the procedure described above and then formed the alignment film 606. The obtained alignment film 606 is approximately 100 nm in thickness in the opening area where the alignment film is formed directly on the second insulating layer 604, approximately 40 nm above the pixel electrode PX, and approximately 30 nm above the column spacer receiving member 13.

In the liquid crystal display panel 1 having this structure, the thickness of the alignment film 606 in the column spacer receiving portion may thus be made approximately ⅓ or less of the thickness of the alignment film 606 in a part of the display area where the alignment film 606 is formed directly on the second insulating layer 604 by disposing the column spacer receiving member 13 which is made of ITO in the column spacer receiving portion of the active matrix substrate 6.

The inventors of the present invention have conducted a vibration test on the liquid crystal display device that includes the liquid crystal display panel 1 having this structure under the conditions given in the first embodiment. No minute bright spots have been found in the tested liquid crystal display device. Thus, the thickness of the alignment film 606 above the column spacer receiving member 13 is desirably more than 0 nm and equal to or less than 30 nm.

As described above, the column spacer receiving member 13 is allowed to have other shapes than a circular shape and an oval shape, including a straight line shape that stretches over the entire width of the panel, with strips of the linear column spacer receiving members 13 formed over the entire length of the panel. The linear column spacer receiving member 13, too, is capable of preventing wetting and spreading varnish from flooding onto the column spacer receiving member 13, and has been confirmed to have substantially the same effects as when the column spacer receiving member 13 is shaped like a circle or an oval.

The linearly shaped column spacer receiving member 13 does not need to be a line parallel to the scanning signal lines GL as the one illustrated in FIG. 4D and, for example, may be a line parallel to the video signal lines DL.

FIG. 5 is a schematic sectional view illustrating an example of the schematic structure of a liquid crystal display panel that is used for comparison with the liquid crystal display panel of the second embodiment.

In order to check the effects of the liquid crystal display panel 1 of the second embodiment, the inventors of the present invention have made a liquid crystal display panel that includes no column spacer receiving member 13 as illustrated in, for example, FIG. 5 and conducted a vibration test on the liquid crystal display panel under the conditions given above. As a result, many minute bright spots have been observed in the tested liquid crystal display device. The liquid crystal display panel of FIG. 5 is the same as the liquid crystal display panel 1 of the second embodiment except that no column spacer receiving member 13 is provided.

While the liquid crystal display panel of FIG. 5 does not include the column spacer receiving member 13, the second insulating layer 604 has surface irregularities and there is a concavity (concave portion) in the vicinity of the column spacer receiving portion. Therefore, upon application of alignment film varnish, some of the alignment film varnish applied to the column spacer receiving portion flows out towards a lower portion such as the concavity near the column spacer receiving portion. However, the alignment film varnish has good wettability with respect to the second insulating layer 604 (e.g., silicon nitride). This makes the alignment film 606 much thicker in the column spacer receiving portion than, for example, above the pixel electrode PX. Accordingly, the chance of minute bright spots, which are caused by the flaking of the alignment film 606 in the column spacer receiving portion, is high for a liquid crystal display device including a liquid crystal display panel that is structured as illustrated in FIG. 5.

As described above, the liquid crystal display panel 1 of the second embodiment, on the other hand, the part of each of the alignment films 606 and 705 that is interposed between the column spacer receiving member 13 and the column spacer 10 is very thin. Therefore, in the same manner as the liquid crystal panel 1 of the first embodiment, the liquid crystal panel 1 of the second embodiment is reduced in amount of the alignment film 606 chipped by vibrations in the column spacer receiving portion as well as in size (volume) of individual flakes of the alignment film 606, and hence has less chance of minute bright spots.

As has been described, the liquid crystal display device that includes the liquid crystal display panel 1 of the second embodiment may avoid minute bright spots caused by the flaking of the part of each of the alignment films 606 and 705 that is interposed between the column spacer 10 and the column spacer receiving member 13 due to vibrations applied during transportation or the like. This allows the liquid crystal display device that includes the liquid crystal display panel 1 of the second embodiment to, for example, lower the luminance of a part that is displayed in black color, and to improve the white/black contrast ratio accordingly.

The shape of the column spacer receiving member 13 in plan view is not limited to the circular shape or the oval shape and may have other shapes. However, when the column spacer receiving member 13 has an angular shape in plan view, the chance is high that alignment film varnish wetting and spreading floods the column spacer receiving member 13 from its corners. It is therefore desirable for the column spacer receiving member 13 to have a non-angular shape in plan view.

The column spacer receiving member 13 in the liquid crystal display panel 1 of the second embodiment may be formed from other materials than ITO, for example, a transparent conductor such as IZO, ITZO, ZnO, or $Sn_2O$. Further, the column spacer receiving member 13 may be formed from other low-surface energy materials than the transparent conductive described above.

In the case where the pixel electrode PX is formed from a transparent conductor such as ITO on the second insulating layer 604 of the active matrix substrate 6 as in the liquid crystal display panel 1 of the second embodiment, forming the column spacer receiving member 13 at the same time as the pixel electrode PX keeps the number of process steps for forming the active matrix substrate 6 from increasing, and prevents a rise in manufacture cost of the liquid crystal display panel 1.

Further, the composition (types and blend ratio of solute and solvent, solute concentration) of the alignment film varnish may be modified to suit individual purposes. Changing the composition of the alignment film varnish may change the wettability with respect to the column spacer receiving member 13. It is therefore an available option to change the combination of the material of the column spacer receiving member 13 and the composition of the alignment film varnish such that an opening is formed above the column spacer receiving member 13, that is, the thickness of the alignment film 606 above the column spacer is formed to be 0 nm upon application of the alignment film varnish. In this case, the alignment film 606 of the active matrix substrate 6 has an opening in the column spacer receiving portion, and hence the obtained liquid crystal display panel 1 has only the alignment film 705 of the counter substrate 7 between the top of the column spacer 10 and the column spacer receiving member 13, or the top of the column spacer 10 and the column spacer receiving member 13 are in direct contact with each other in the obtained liquid crystal display panel 1. A liquid crystal display device including this liquid crystal display panel 1 has even less chance of minute bright spots which are caused by the flaking of the alignment films 606 and 705.

The second embodiment takes as an example the lateral field driving liquid crystal display panel 1 that has pixels structured as illustrated in FIGS. 4A to 4F. However, the pixel structure (e.g., the shapes of the TFT device, the pixel electrode, and the common electrode in plan view (planar layout)) is not limited to the one illustrated in FIGS. 4A to 4D and may be modified to suit individual purposes.

Further, in the liquid crystal display panel 1 of the second embodiment, the column spacer 10 is formed on the counter substrate 7 and the column spacer receiving member 13 is formed on the active matrix substrate 6. However, the present invention is not limited thereto, and the column spacer 10 may be formed on the active matrix substrate 6 and the column spacer receiving member 13 may be formed on the counter substrate 7.

Figure 6:
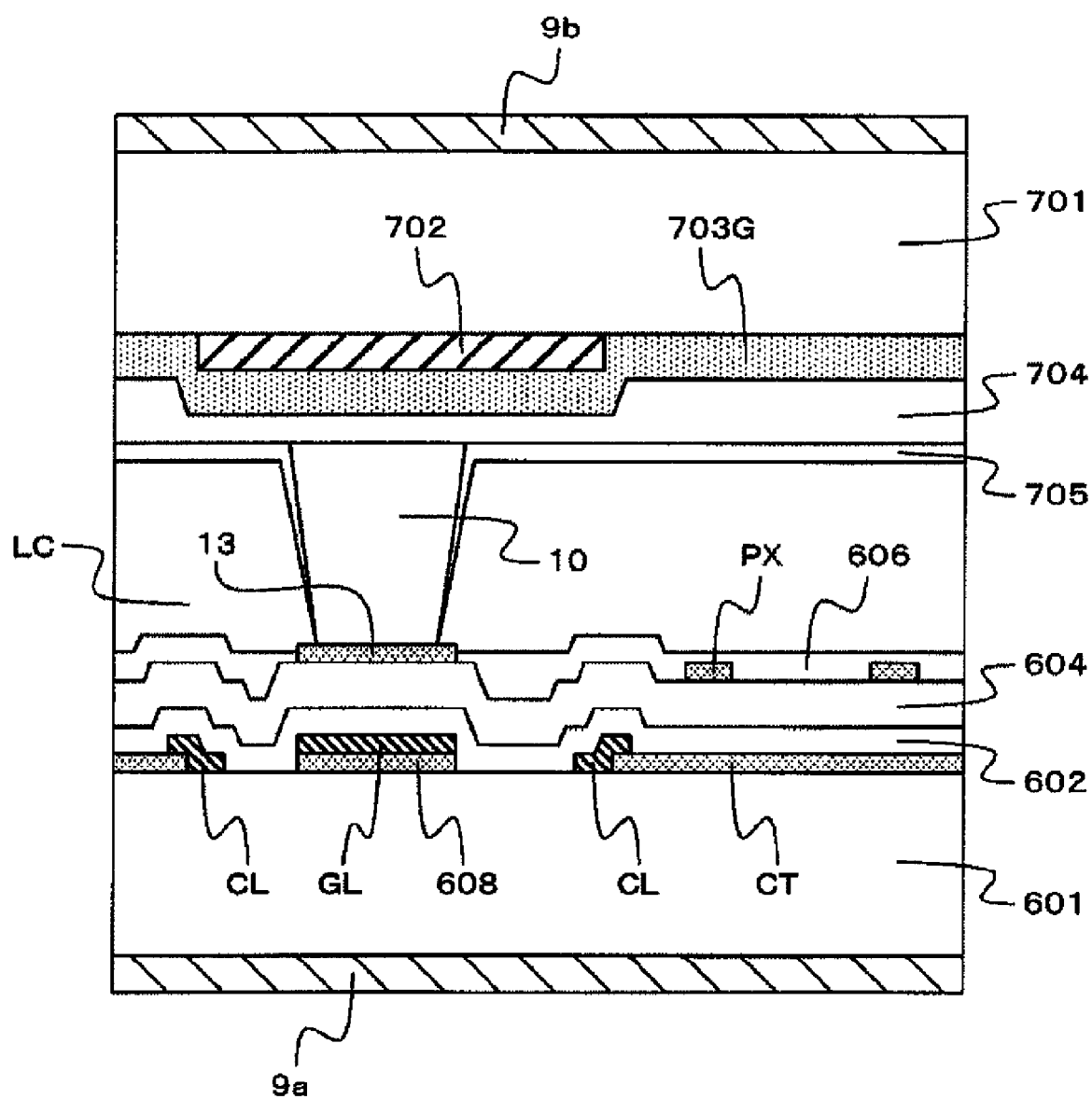
FIG. 6 is a schematic sectional view illustrating a modification example of the liquid crystal display panel of the second embodiment.

FIG. 6 is a schematic sectional view illustrating a modification example of the liquid crystal display panel of the second embodiment.

In the sectional structure illustrated in FIG. 4C as an example of the liquid crystal display panel 1 of the second embodiment, the planar dimensions of the column spacer receiving member 13 are smaller than those of the top of the column spacer 10, so that only the central part of the top of the column spacer 10 is in contact with the column spacer receiving member 13 through the alignment films 606 and 705, or directly. The liquid crystal display panel 1 of the second embodiment is not limited to this structure. For instance, the planar dimensions of the column spacer receiving member 13 may be larger than those of the top of the column spacer 10 as illustrated in FIG. 6, so that the entire top of the column spacer 10 is in contact with the column spacer receiving member 13 through the alignment films 606 an 705, or directly.

In the case where the planar dimensions of the column spacer receiving member 13 are smaller than those of the top of the column spacer 10 as illustrated in FIG. 4C, the column spacer receiving member 13 sometimes digs into the top of the column spacer 10, for example, when the active matrix substrate 6 and the counter substrate 7 are bonded together to enclose a liquid crystal material. This could bring, for example, the rim of the top of the column spacer 10 into contact with a relatively thick part of each of the alignment film 606 of the active matrix substrate 6, thus chipping the alignment film 606 at the contact point and causing minute bright spots.

In contrast, when the column spacer receiving member 13 is given larger planar dimensions than those of the top of the column spacer 10 as illustrated in FIG. 6, the entire top of the column spacer 10 may be brought into contact with the column spacer receiving member 13 through a very thin part of each of the alignment films 606 and 705, or directly. Another advantage of giving the column spacer receiving member 13 larger planar dimensions than those of the top of the column spacer 10 as illustrated in FIG. 6 is that a contact between the column spacer 10 and a relatively thick part of each of the alignment film 606 of the active matrix substrate 6 is avoided easily when the column spacer 10 and the column spacer receiving member 13 are misaligned during, for example, the bonding of the active matrix substrate 6 and the counter substrate 7.

The inventors of the present invention have tested a liquid crystal display device including the liquid crystal display panel 1 that has the sectional structure illustrated in FIG. 4C. The test is, for example, the same as the vibration test described above, except that the acceleration has been set to 1.5 G. The presence of many minute bright spots in the tested liquid crystal display device has been confirmed.

The above-mentioned vibration test with the acceleration set to 1.5 G has been conducted also on a liquid crystal display device including the liquid crystal display panel 1 that has the sectional structure illustrated in FIG. 6. No minute bright spots have been found in the tested liquid crystal display device. It is concluded from this result that setting the planar dimensions of the column spacer receiving member 13 larger than those of the top of the column spacer 10 enhances the effect of preventing minute bright spots, which are caused by the flaking of the alignment film 606.

It should be noted that, as described above, minute bright spots due to the flaking of the alignment film 606 may be prevented also when the planar dimensions of the column spacer receiving member 13 are smaller than those of the top of the column spacer 10 as in FIG. 4C.

[Third Embodiment]

Figure 7:
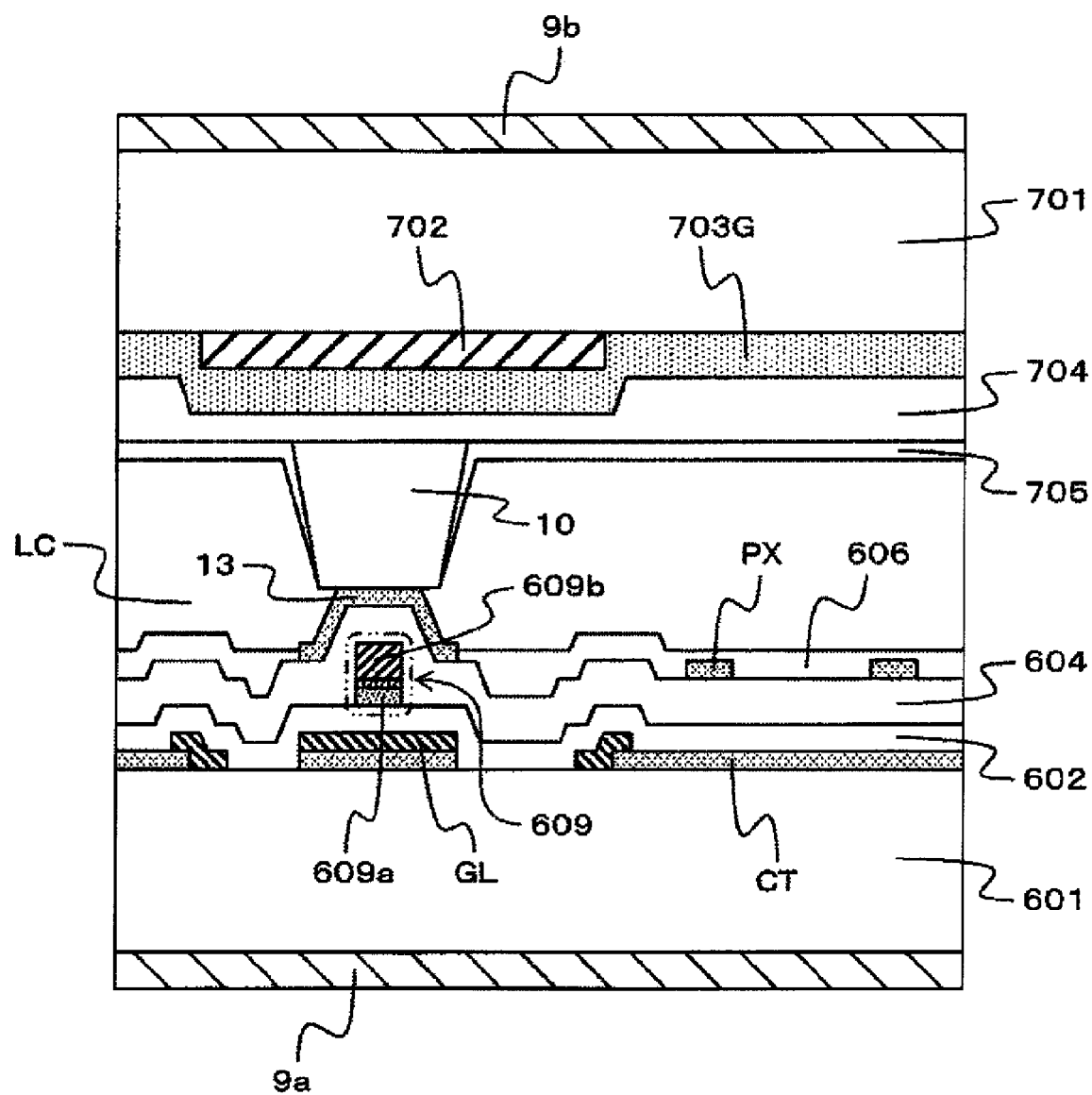
FIG. 7 is a schematic sectional view illustrating an example of a sectional structure of main parts of a liquid crystal display panel according to a third embodiment of the present invention.

FIG. 7 is a schematic sectional view illustrating an example of the sectional structure of main parts of a liquid crystal display panel according to a third embodiment of the present invention.

FIG. 7 is an example of the same sectional structure as illustrated in FIG. 4C, specifically, the sectional structure cut along the line IVC-IVC of FIG. 4A.

The third embodiment takes a lateral field driving liquid crystal display panel 1 as an example of the liquid crystal display panel 1 to which the embodiment mode is applied. The third embodiment deals with a case in which a single pixel and its peripheries in the liquid crystal display panel 1 are structured as illustrated in FIGS. 4A and 4B.

In the liquid crystal display panel 1 of the third embodiment, the sectional structure cut along the line IVC-IVC of FIG. 4A differs from that of the second embodiment, and is as illustrated in FIG. 7, for example.

In FIG. 7, the column spacer receiving portion of the active matrix substrate 6 has a protrusion forming member 609, which includes a semiconductor layer 609a and a conductive layer 609b and which is interposed between one scanning signal line GL and the column spacer receiving member 13, more specifically, between the first insulating layer 602 and the second insulating layer 604. The semiconductor layer 609a of the protrusion forming member 609 is formed in the step of forming the insular semiconductor film that is used as the semiconductor layer 603 of the TFT device Tr. The conductive layer 609b of the protrusion forming member 609 is formed in the step of forming the video signal lines DL and the source electrode 607.

With the protrusion forming member 609 formed in the column spacer receiving portion in this manner, when the second insulating layer 604 is formed by a deposition method such as CVD, the central part of the second insulating layer 604 in the column spacer receiving portion protrudes from its perimeter by an amount substantially equal to the height of the protrusion forming member 609. Though not illustrated in the drawing, when one protrusion forming member 609 is formed for one column spacer receiving portion and the protrusion forming member 609 has a circular shape in plan view (plan view of FIG. 4A), the protruding part of the second insulating layer 604 in the column spacer receiving portion has a substantially conical frustum shape (body of rotation obtained by rotating a trapezoid).

In the liquid crystal display panel 1 of the third embodiment, the column spacer receiving member 13 is formed as illustrated in FIG. 7 to extend to the outside of the protrusion of the second insulating layer 604 which has been created by providing the protrusion forming member 609.

On the other hand, the counter substrate 7 in the liquid crystal display panel 1 of the third embodiment has basically the same structure as that of the counter substrate 7 in the liquid crystal display panel 1 of the second embodiment. A detailed description on the structure of the counter substrate 7 is therefore omitted here.

The column spacer receiving member 13 and the column spacer 10 are in direct contact with each other in the sectional structure of FIG. 7. However, the third embodiment is not limited thereto and the alignment films 606 and 705 having a thickness of a few nm may be interposed between the column spacer receiving member 13 and the column spacer 10.

The active matrix substrate 6 in the liquid crystal display panel 1 of the third embodiment may be formed by, for example, the same procedure that has been described in the second embodiment. The only necessary modifications to the procedure are to form the semiconductor layer 609a of the protrusion forming member 609 at the same time the insular semiconductor film is formed on the first insulating layer 602, and to form the conductive layer 609b of the protrusion forming member 609 at the same time the video signal lines DL and the source electrode 607 are formed.

When, for instance, the common electrode CT and the conductive layer 608 are approximately 0.05 µm each in thickness, the scanning signal lines GL are approximately 0.4 µm in thickness, the first insulating layer 602 is approximately 0.2 µm in thickness, the semiconductor layer 609a is approximately 0.2 μm in thickness, the conductive layer 609b is approximately 0.4 μm in thickness, the second insulating layer 604 is approximately 0.3 μm thickness, and the pixel electrode PX and the column spacer receiving member 13 are approximately 0.05 μm each in thickness, the distance from the glass substrate 601 to the top of the protrusion of the column spacer receiving member 13 is approximately 1 μm longer than the distance from the glass substrate 601 to the pixel electrode PX.

In this case, the column spacer receiving member 13 is formed from a transparent conductor such as ITO, and hence it is difficult for alignment film varnish to wet and spread over the transparent conductor film (in other words, the column spacer receiving member 13 tends to repel the alignment film varnish) when the alignment film varnish is applied. The alignment film varnish applied to the column spacer receiving member 13 therefore flows over to the outside of the column spacer receiving member 13.

This makes the alignment film 606, which is obtained by applying the alignment film varnish and then performing heat treatment and rubbing, much thinner above the column spacer receiving member 13, in particular, above the top of the central protrusion, than in an opening area where the alignment film 606 is formed directly on the second insulating layer 604.

The inventors of the present invention have executed the step of forming the common electrode CT and the conductive layer 608 on the glass substrate 601 to the step of forming the pixel electrode PX and the column spacer receiving member 13, making sure that the formed components have the thicknesses described above. After that, the alignment film 606 has been formed by the procedure described in the second embodiment. The thickness of the obtained alignment film 606 is approximately 120 nm in an opening area where the alignment film 606 is formed directly on the second insulating layer 604, approximately 70 nm above the pixel electrode PX, and approximately 2 nm above the column spacer receiving member 13.

The inventors of the present invention have also formed the alignment film 606 while varying the height of the protrusion of the column spacer receiving member 13 (i.e., the height of the level difference between the central part and the rim). It has been found that setting the height of the protrusion to 400 nm or higher makes the alignment film 606 very thin above the column spacer receiving member 13.

The counter substrate 7 of the liquid crystal display panel 1 of the third embodiment is formed by the same procedure as in prior art, and a description on the step of forming the counter substrate 7 is therefore omitted. The inventors of the present invention have formed the column spacer 10 approximately 4.2 μm in height on the overcoat layer 704, and then formed the alignment film 705 of the counter substrate 7 by the same procedure used to form the alignment film 606 of the active matrix substrate 6. The thickness of the obtained alignment film 705 is approximately 100 nm in the opening area and approximately 5 nm above the top of the column spacer 10.

The inventors of the present invention have conducted a vibration test on the liquid crystal display device that includes the liquid crystal display panel 1 of the third embodiment under the conditions described in the first embodiment. No minute bright spots have been found in the tested liquid crystal display device.

A vibration test has been conducted on the liquid crystal display device that includes the liquid crystal display panel 1 of the third embodiment under the conditions given in the first embodiment, except that the acceleration is set to 2.0 G. This test has not found minute bright spots, either.

Figure 8:
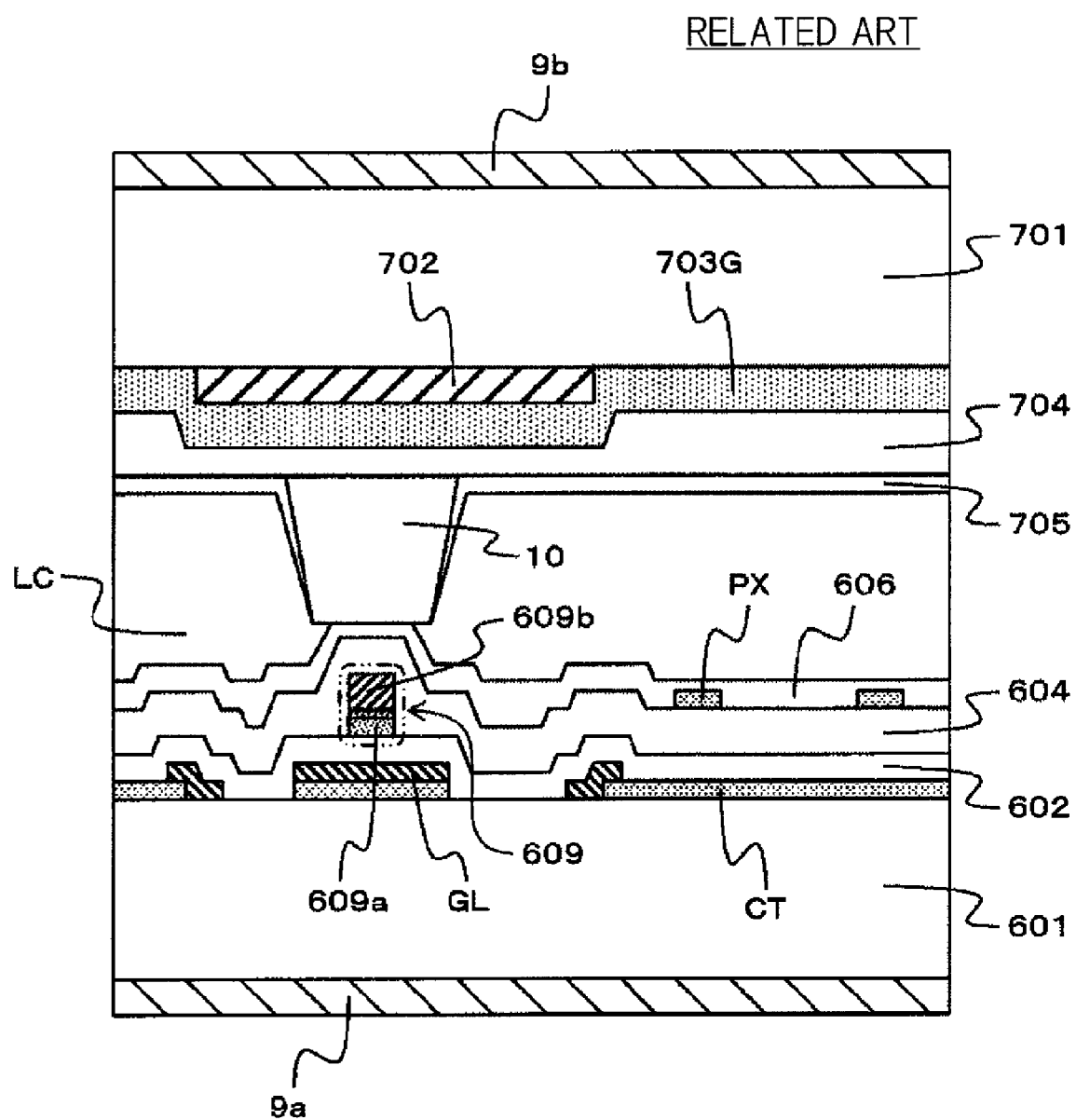
FIG. 8 is a schematic sectional view illustrating an example of a schematic structure of a liquid crystal display panel that is used for comparison with the liquid crystal display panel of the third embodiment.

FIG. 8 is a schematic sectional view illustrating an example of the schematic structure of a liquid crystal display panel that is used for comparison with the liquid crystal display panel of the third embodiment.

In order to check the effects of the liquid crystal display panel 1 of the third embodiment, the inventors of the present invention have made a liquid crystal display panel that includes no column spacer receiving member 13 as illustrated in, for example, FIG. 8 and conducted a vibration test on the liquid crystal display panel under the conditions given above. As a result, many minute bright spots have been observed in the tested liquid crystal display device even when the acceleration has been set to 1.0 G. The liquid crystal display panel of FIG. 8 is the same as the liquid crystal display panel 1 of the third embodiment except that no column spacer receiving member 13 is provided.

While the liquid crystal display panel of FIG. 8 does not include the column spacer receiving member 13, the second insulating layer 604 has surface irregularities and there is a protrusion in the central part of the column spacer receiving portion. Therefore, upon application of alignment film varnish, some of the alignment film varnish applied to the column spacer receiving portion flows out towards the concavity near the column spacer receiving portion. However, the alignment film varnish has good wettability with respect to the second insulating layer 604 (e.g., silicon nitride). This makes the thickness of the alignment film 606 much thicker in the column spacer receiving portion than, for example, above the pixel electrode PX. Accordingly, the chance of minute bright spots, which are caused by the flaking of the alignment film 606 in the column spacer receiving portion, is high for a liquid crystal display device including a liquid crystal display panel that is structured as illustrated in FIG. 8.

As described above, in the liquid crystal display panel 1 of the third embodiment, on the other hand, the part of each of the alignment films 606 and 705 that is interposed between the column spacer receiving member 13 and the column spacer 10 is very thin. Therefore, in the same manner as the liquid crystal panel 1 of the first embodiment and the second embodiment, the liquid crystal panel 1 of the third embodiment is reduced in amount of the alignment film 606 chipped by vibrations in the column spacer receiving portion as well as in size (volume) of individual flakes of the alignment film 606, and hence has less chance of minute bright spots.

As has been described, a liquid crystal display device that includes the liquid crystal display panel 1 of the third embodiment may avoid minute bright spots caused by the flaking of the part of each of the alignment films 606 and 705 that is interposed between the column spacer 10 and the column spacer receiving member 13 due to vibrations applied during transportation or the like. This allows the liquid crystal display device that includes the liquid crystal display panel 1 of the third embodiment to, for example, lower the luminance of a part that is displayed in black color, and to improve the white/black contrast ratio accordingly.

Further, the shape of the column spacer receiving member 13 in plan view is not limited to the circular shape or the oval shape and may have other shapes. However, when the column spacer receiving member 13 has an angular shape in plan view, the chance is high that alignment film varnish wetting and spreading floods the column spacer receiving member 13 from its corners. It is therefore desirable for the column spacer receiving member 13 to have a non-angular shape in plan view.

The column spacer receiving member 13 in the liquid crystal display panel 1 of the third embodiment may be formed from other materials than ITO, for example, a transparent conductor such as IZO, ITZO, ZnO, or $Sn_2O$. Further, the column spacer receiving member 13 may be formed from other low-surface energy materials than the transparent conductive described above.

In the case where the pixel electrode PX is formed from a transparent conductor such as ITO on the second insulating layer 604 of the active matrix substrate 6 as in the liquid crystal display panel 1 of the third embodiment, forming the column spacer receiving member 13 at the same time as the pixel electrode PX keeps the number of process steps for forming the active matrix substrate 6 from increasing, and prevents a rise in manufacture cost of the liquid crystal display panel 1.

The composition (types and blend ratio of solute and solvent) of the alignment film varnish may be modified to suit individual purposes. Changing the composition of the alignment film varnish may change the wettability with respect to the column spacer receiving member 13. It is therefore an available option to change the combination of the material of the column spacer receiving member 13 and the composition of the alignment film varnish such that an opening is formed above the column spacer receiving member 13 upon application of the alignment film varnish. In this case, the alignment film 606 of the active matrix substrate 6 has an opening in the column spacer receiving portion, and hence the obtained liquid crystal display panel 1 has only the alignment film 705 of the counter substrate 7 between the top of the column spacer 10 and the column spacer receiving member 13, or the top of the column spacer 10 and the column spacer receiving member 13 are in direct contact with each other in the obtained liquid crystal display panel 1. A liquid crystal display device including this liquid crystal display panel 1 has even less chance of minute bright spots which are caused by the flaking of the alignment films 606 and 705.

The third embodiment takes as an example the lateral field driving liquid crystal display panel 1 that has pixels structured as illustrated in FIGS. 4A, 4B, and 7. However, the pixel structure (e.g., the shapes of the TFT device, the pixel electrode, and the common electrode in plan view (planar layout)) is not limited to the one illustrated in FIGS. 4A, 4B, and 7 and may be modified to suit individual purposes.

Further, in the liquid crystal display panel 1 of the third embodiment, the column spacer 10 is formed on the counter substrate 7 and the column spacer receiving member 13 is formed on the active matrix substrate 6. However, the present invention is not limited thereto, and the column spacer 10 may be formed on the active matrix substrate 6 and the column spacer receiving member 13 may be formed on the counter substrate 7.

Figure 9A:
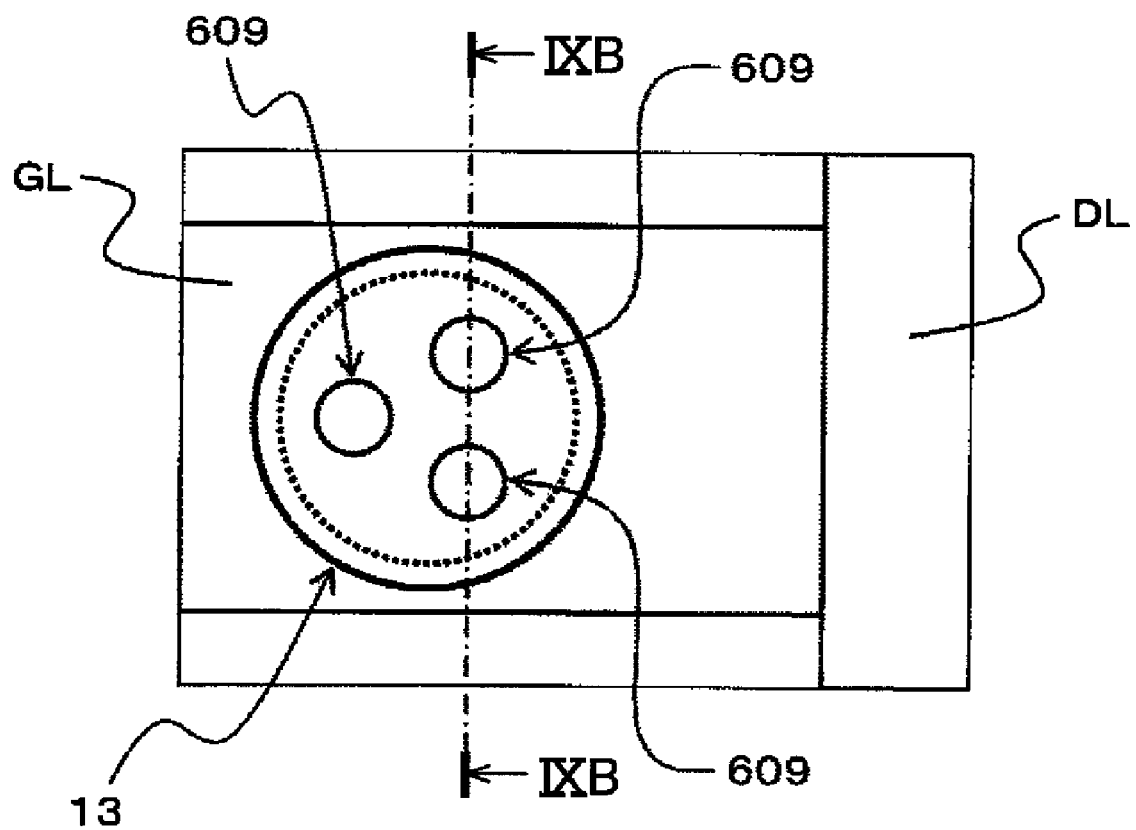
FIG. 9A is a schematic plan view illustrating a modification example of a column spacer receiving portion in an active matrix substrate of the liquid crystal display panel of the third embodiment.
Figure 9B:
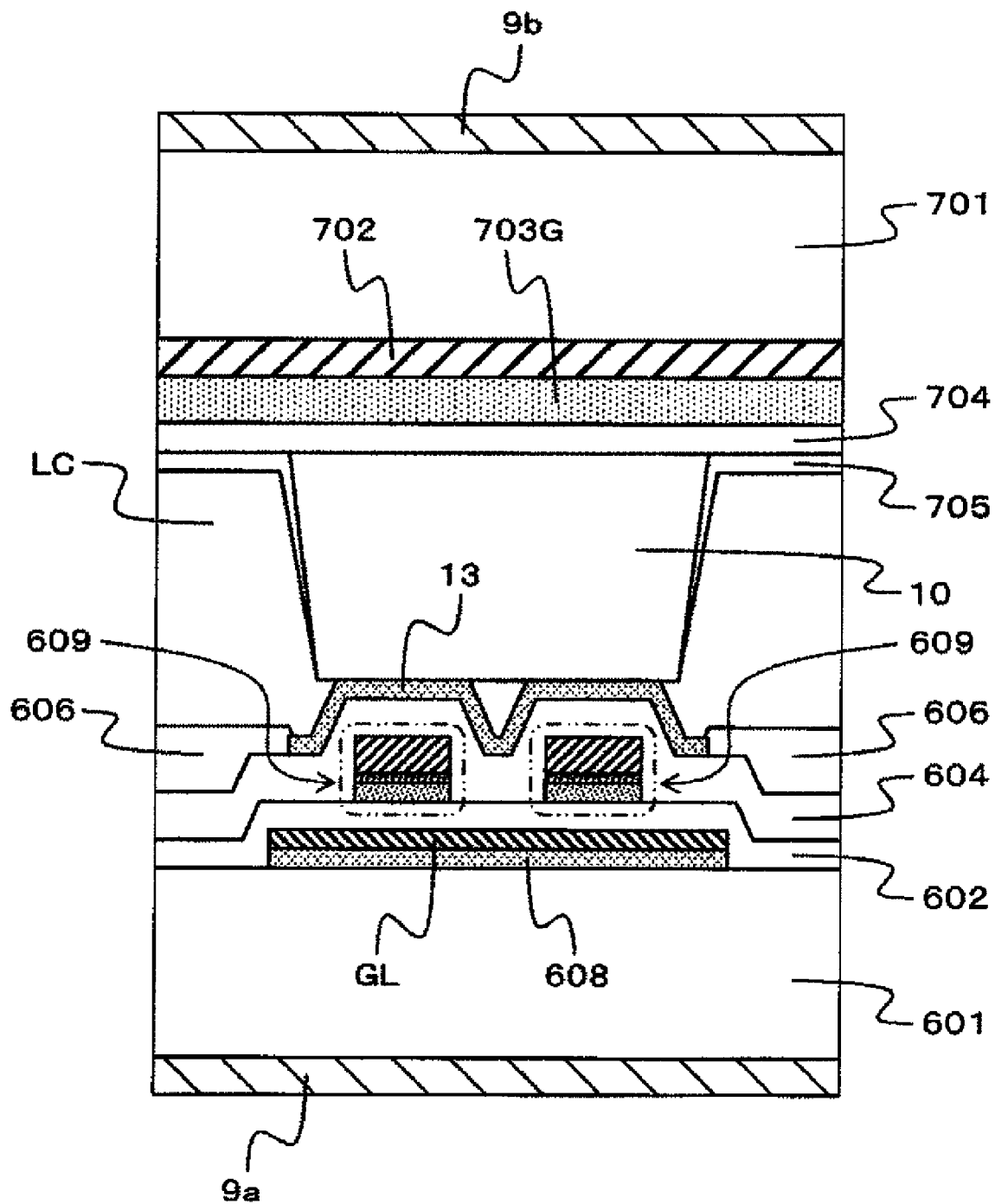
FIG. 9B is a schematic sectional view illustrating an example of a sectional structure cut along the line IXB-IXB of FIG. 9A.

FIGS. 9A and 9B are schematic diagrams illustrating a modification example of the liquid crystal display panel of the third embodiment.

FIG. 9A is a schematic plan view illustrating a modification example of the column spacer receiving portion in the active matrix substrate of the liquid crystal display panel of the third embodiment. FIG. 9B is a schematic sectional view illustrating an example of a sectional structure cut along the line IXB-IXB of FIG. 9A.

FIG. 9B also illustrates the liquid crystal layer LC (liquid crystal material) and the counter substrate 7 which are above the active matrix substrate 6.

In the sectional structure illustrated in FIG. 7 as an example of the liquid crystal display panel 1 of the third embodiment, only one protrusion forming member 609 is provided for one column spacer receiving portion. However, the liquid crystal display panel 1 of the third embodiment is not limited to this structure, and a plurality of protrusion forming members 609 may be disposed in one column spacer receiving portion.

When three protrusion forming members 609 are disposed in one column spacer receiving portion in the liquid crystal display panel 1 of the third embodiment, the three protrusion forming members 609 are arranged as illustrated in FIGS. 9A and 9B. The circle drawn in a dotted line in FIG. 9A represents the rim of the top of the column spacer 10.

When a plurality of protrusion forming members 609 are disposed in one column spacer receiving portion in this manner, one column spacer receiving member 13 and one column spacer 10 are in contact with each other at a plurality of points. This reduces the displacement of the column spacer 10 which may occur during, for example, the bonding of the active matrix substrate 6 and the counter substrate 7.

The inventors of the present invention have conducted a vibration test, under the conditions given in the first embodiment, on a liquid crystal display device including the liquid crystal display panel 1 that has been modified to give the column spacer receiving portion the structure illustrated in FIGS. 9A and 9B. No minute bright spots have been found in the tested liquid crystal display device.

Figure 10:
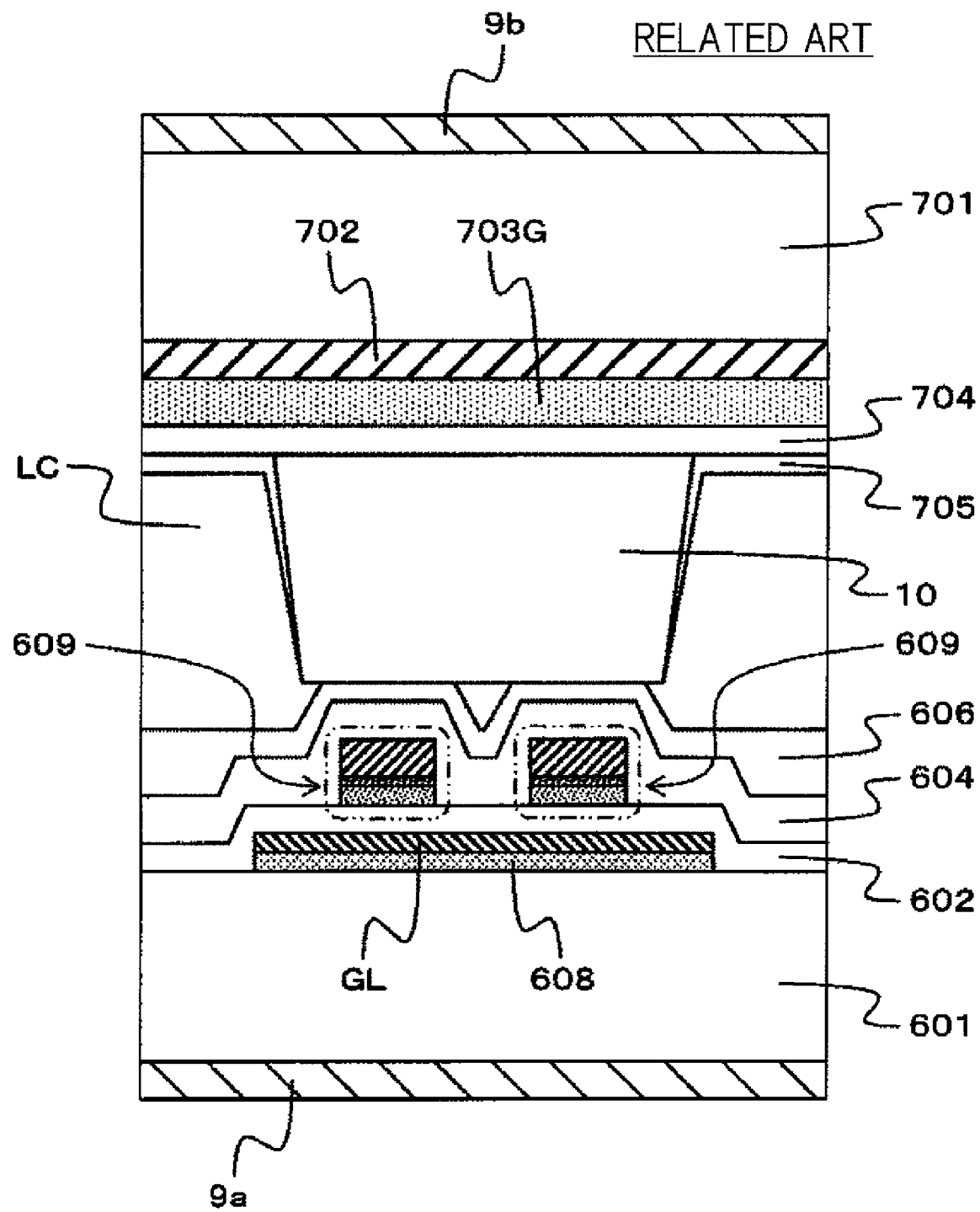
FIG. 10 is a schematic sectional view illustrating an example of a schematic structure of a liquid crystal display panel that is used for comparison with the liquid crystal display panel according to the modification example of the third embodiment.

FIG. 10 is a schematic sectional view illustrating an example of the schematic structure of a liquid crystal display panel that is used for comparison with the modification example of the liquid crystal display panel of the third embodiment.

In order to check the effects of the modification example of the liquid crystal display panel 1 of the third embodiment, the inventors of the present invention have made a liquid crystal display panel that includes no column spacer receiving member 13 as illustrated in, for example, FIG. 10 and conducted a vibration test on the liquid crystal display panel under the conditions given above. As a result, many minute bright spots have been observed in the tested liquid crystal display device. The liquid crystal display panel of FIG. 10 is the same as the liquid crystal display panel 1 of FIGS. 9A and 9B except that no column spacer receiving member 13 is provided.

While the liquid crystal display panel of FIG. 10 does not include the column spacer receiving member 13, the second insulating layer 604 has surface irregularities and there are a plurality of protrusions (three) in the central part of the column spacer receiving portion. Therefore, upon application of alignment film varnish, some of the alignment film varnish applied to the column spacer receiving portion flows out towards a lower portion such as the concavity near the column spacer receiving portion. However, the alignment film varnish has good wettability with respect to the second insulating layer 604 (e.g., silicon nitride). This makes the thickness of the alignment film 606 much thicker in the column spacer receiving portion than, for example, above the pixel electrode PX. Accordingly, the chance of minute bright spots, which are caused by the flaking of the alignment film 606 in the column spacer receiving portion, is high for a liquid crystal display device including a liquid crystal display panel that is structured as illustrated in FIG. 10.

As described above, in the liquid crystal display panel 1 illustrated in FIGS. 9A and 9B, on the other hand, the part of each of the alignment films 606 and 705 that is interposed between the column spacer receiving member 13 and the column spacer 10 is very thin. Therefore, in the same manner as the liquid crystal panel 1 of the third embodiment, the liquid crystal panel 1 illustrated in FIGS. 9A and 9B is reduced in amount of the alignment film 606 chipped by vibrations in the column spacer receiving portion as well as in size (volume) of individual flakes of the alignment film 606, and hence has less chance of minute bright spots.

[Fourth Embodiment]

Figure 11:
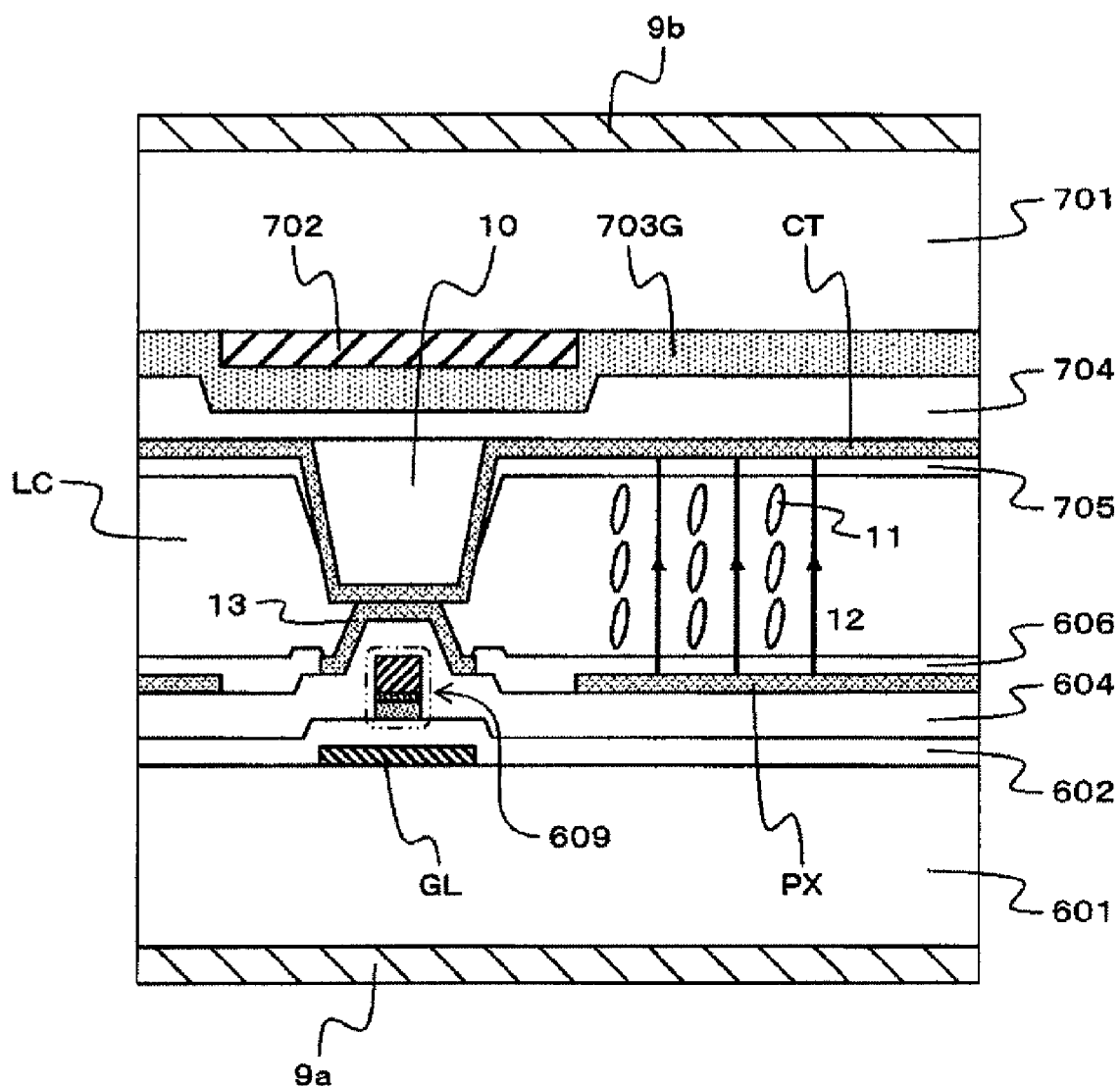
FIG. 11 is a schematic sectional view illustrating an example of a sectional structure of main parts of a liquid crystal display panel according to a fourth embodiment of the present invention.

FIG. 11 is a schematic sectional view illustrating an example of the sectional structure of main parts of a liquid crystal display panel according to a fourth embodiment of the present invention.

The fourth embodiment takes a vertical field driving liquid crystal display panel as an example of the liquid crystal display panel 1 to which the embodiment mode is applied. The vertical field driving liquid crystal display panel 1 includes the pixel electrode PX on the active matrix substrate 6 and the common electrode CT on the counter substrate 7 as illustrated in FIG. 11, for example.

In the case where the liquid crystal display panel 1 employs VA, which is one of the vertical field driving methods, the pixel electrode PX and the common electrode CT are formed from a transparent conductor such as ITO into a simple flat shape. The liquid crystal molecules 11 in this case are aligned vertically with respect to the surfaces of the glass substrates 601 and 701 by the alignment films 606 and 705 during no-electric field application in which the pixel electrode PX and the common electrode CT have an equal electric potential. When an electric potential difference is created between the pixel electrode PX and the common electrode CT, the electric field 12 (electric flux lines) substantially perpendicular to the glass substrates 601 and 701 is generated, thereby flattening the liquid crystal molecules 11 in a direction parallel to the substrates 601 and 701 and changing the polarization state of incident light. Further, in this case, the orientation of the liquid crystal molecules 11 is determined by the intensity of the applied electric field 12. A liquid crystal display device is therefore allowed to display a video or an image by, for example, performing a pixel-based control of a video signal (gray scale voltage) to be applied to the pixel electrode PX and thus changing the light transmittance in individual pixels while fixing the electric potential of the common electrode CT.

Various structures are known as a pixel structure (e.g., the shapes of the TFT device Tr and the pixel electrode PX in plan view (planar layout)) that is employed in the VA liquid crystal display panel 1. The liquid crystal display panel 1 of the fourth embodiment employs one of those pixel structures. A detailed description on the pixel structure in the liquid crystal display panel 1 is therefore omitted in the fourth embodiment.

Further, the liquid crystal display panel 1 of the fourth embodiment is similar to the liquid crystal display panels 1 of the first to third embodiments in that the column spacer 10 is formed on the counter substrate 7 whereas the column spacer receiving member 13 is formed on the active matrix substrate 6. In this case, the column spacer receiving member 13 is formed above the scanning signal line GL as illustrated in FIG. 11. The liquid crystal display panel 1 of the fourth embodiment also includes the protrusion forming member 609, which is constituted of the semiconductor layer 609a and the conductive layer 609b, between the scanning signal line GL and the column spacer receiving member 13.

The counter substrate 7 of the liquid crystal display panel 1 of the fourth embodiment is obtained by forming the black matrix 702, the color filters 703R, 703G, and 703B, the overcoat layer 704, and the column spacer 10 on a surface of the glass substrate 701, then forming the common electrode CT from a transparent conductive film such as an ITO film, and then forming the alignment film 705 on the common electrode CT. The common electrode CT is usually formed by a deposition method such as CVD, which makes the thickness of the common electrode CT on the top of the column spacer 10 substantially equal to the thickness of the common electrode CT in places where the common electrode CT is formed directly on the overcoat layer 704.

The alignment film 705 on the common electrode CT is formed by applying alignment film varnish and performing heat treatment and rubbing. The alignment film varnish applied to the top of the column spacer 10 flows down the column spacer 10 toward the outside of the column spacer 10. The thickness of the alignment film 705 above the top of the column spacer 10 is therefore very thin, for example, a few μm, as in the liquid crystal display panels 1 of the first to third embodiments. The column spacer 10 in this example includes a transparent conductive film such as an ITO film on its top. The alignment film 705 therefore may have an opening in the top of the column spacer 10, depending on the height of the column spacer 10.

The liquid crystal display panel 1 of the fourth embodiment may be manufactured by the same procedure that is used to manufacture a conventional VA liquid crystal display panel. The only necessary modification to the procedure is to form the column spacer receiving member 13 along with the pixel electrode PX in the step of forming the pixel electrode PX of the active matrix substrate 6. A description on a method of manufacturing the liquid crystal display panel 1 of the fourth embodiment is therefore omitted.

The inventors of the present invention have sealed a VA liquid crystal material whose dielectric anisotropy $\Delta\in$ is negative between the active matrix substrate 6 and the counter substrate 7 structured as described above, to thereby obtain the liquid crystal display panel 1 of the fourth embodiment. A vibration test has been conducted under the conditions given above on a liquid crystal display device that includes the obtained liquid crystal display panel 1. As a result, no minute bright spots have been found in the tested liquid crystal display device.

The above-mentioned variation test has also been conducted on the liquid crystal display device that includes the liquid crystal display panel 1 of the fourth embodiment, with the acceleration set to 2.5 G. This test has not found minute bright spots, either.

In contrast, the inventors of the present invention have made the liquid crystal display panel 1 that has a conventional structure where the column spacer receiving member 13 is not formed on the active matrix substrate 6, and conducted the vibration test described above. Many minute bright spots have been found in the tested liquid crystal display device, even at an acceleration of 1.0 G.

As has been described, a liquid crystal display device that includes the liquid crystal display panel 1 of the fourth embodiment may avoid minute bright spots caused by the flaking of the part of each of the alignment films 606 and 705 that is interposed between the column spacer 10 and the column spacer receiving member 13 due to vibrations applied during transportation or the like. This allows the liquid crystal display device that includes the liquid crystal display panel 1 of the fourth embodiment to, for example, lower the luminance of a part that is displayed in black color, and to improve the white/black contrast ratio accordingly.

Further, the shape of the column spacer receiving member 13 in plan view is not limited to the circular shape or the oval shape, and may have other shapes. However, when the column spacer receiving member 13 has an angular shape in plan view, the chance is high that alignment film varnish wetting and spreading floods the column spacer receiving member 13 from its corners. It is therefore desirable for the column spacer receiving member 13 to have a non-angular shape in plan view.

The column spacer receiving member 13 in the liquid crystal display panel 1 of the fourth embodiment may be formed from other materials than ITO, for example, a transparent conductor film such as IZO, ITZO, ZnO, or $Sn_2O$. Further, the column spacer receiving member 13 may be formed from other low-surface energy materials than the transparent conductive film described above.

When the pixel electrode PX is formed from a transparent conductor such as ITO on the second insulating layer 604 of the active matrix substrate 6 as in the liquid crystal display panel 1 of the fourth embodiment, forming the column spacer receiving member 13 at the same time the pixel electrode PX is formed keeps the number of process steps for forming the active matrix substrate 6 from increasing. Further, in the step of forming the counter substrate 7, the ITO film is etched when, for example, the common electrode CT is formed, thereby eliminating the step of removing the column spacer 10 and ITO from around the column spacer 10. The liquid crystal display panel 1 of the fourth embodiment may thus prevent a rise in manufacture cost.

The fourth embodiment takes the VA liquid crystal display panel 1 as an example. However, the fourth embodiment is not limited to this structure, and is applicable to other vertical field driving liquid crystal display panels such as a TN liquid crystal display panel. In that case, the pixel structure (e.g., the shapes in plan view of the TFT device and the pixel electrode (planar layout)) may be modified to suit individual cases.

[Fifth Embodiment]

Figure 12A:
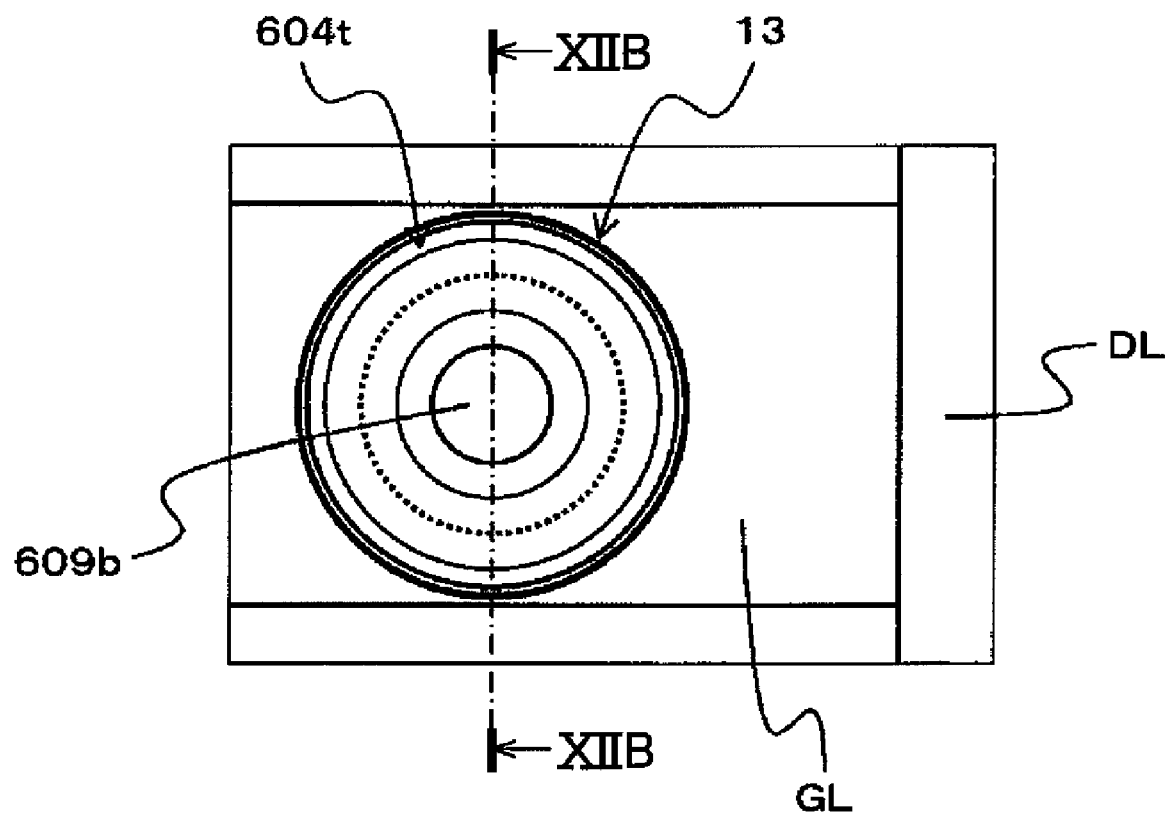
FIG. 12A is a schematic plan view illustrating an example of a planar structure of a column spacer receiving portion and its periphery in an active matrix substrate of a liquid crystal panel according to a fifth embodiment of the present invention.
Figure 12B:
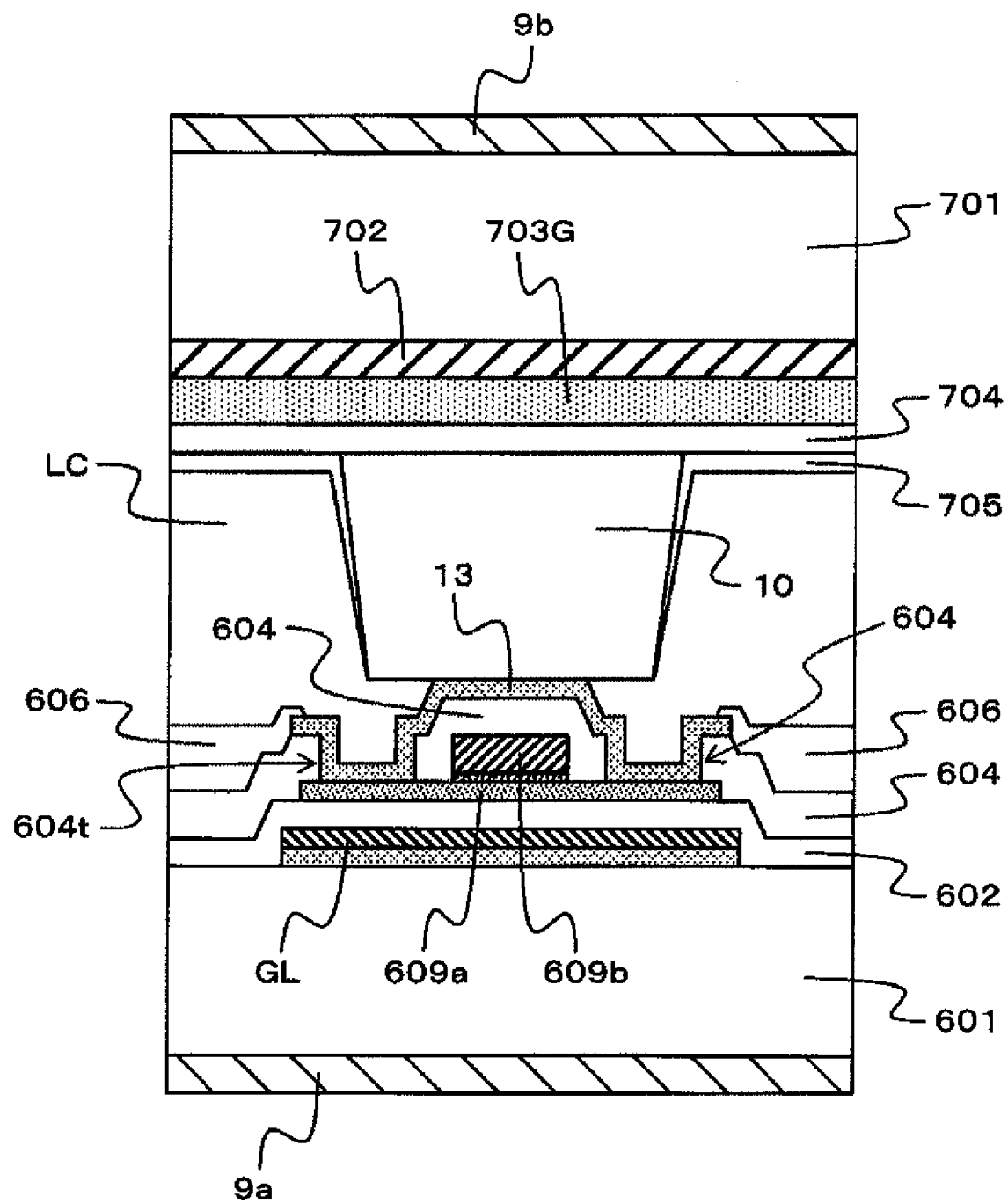
FIG. 12B is a schematic sectional view illustrating an example of a sectional structure cut along the line XIIB-XIIB of FIG. 12A.

FIGS. 12A and 12B are schematic sectional views illustrating an example of the schematic structure of main parts of a liquid crystal display panel according to a fifth embodiment of the present invention.

FIG. 12A is a schematic plan view illustrating an example of the planar structure of a column spacer receiving portion and its peripheries in an active matrix substrate of the liquid crystal display panel according to the fifth embodiment. FIG. 12B is a schematic sectional view illustrating an example of a sectional structure cut along the line XIIB-XIIB of FIG. 12A.

FIG. 12B also illustrates the liquid crystal layer LC (liquid crystal material) and the counter substrate which are above the active matrix substrate.

The fifth embodiment takes a lateral field driving liquid crystal display panel as an example of the liquid crystal display panel 1 to which the embodiment mode is applied. Further, the liquid crystal display panel 1 described in the fifth embodiment has a basic pixel structure as the one described in the second embodiment (structure illustrated in FIGS. 4A and 4B), and the only difference is the structure of the column spacer receiving portion on the active matrix substrate 6.

The column spacer receiving portion in the liquid crystal display panel 1 of the fifth embodiment is structured, for example, as illustrated in FIGS. 12A and 12B, where a ring-like concave portion 604t is formed in the second insulating layer 604. Further, the protrusion forming member 609 including the semiconductor layer 609a and the conductive layer 609b is formed above the scanning signal line GL. In this case, the perimeter of the first amorphous silicon layer in the semiconductor layer 609a of the protrusion forming member 609 is outside the concave portion 604t of the second insulating layer 604. Further, the second amorphous silicon layer in the semiconductor layer 609a of the protrusion forming member 609 and the conductive layer 609b are inside the concave portion 604t of the second insulating layer 604. The rim of the column spacer receiving member 13 is outside the concave portion 604t of the second insulating layer 604.

The active matrix substrate 6 of the liquid crystal display panel 1 of the fifth embodiment may basically be formed by the procedure described in the second embodiment. However, in forming the active matrix substrate 6 of the liquid crystal display panel 1 of the fifth embodiment, the semiconductor layer 609a of the protrusion forming member 609 is formed at the same time the insular semiconductor film used as the semiconductor layer 603 of the TFT device Tr is formed by etching an amorphous silicon film. At this time, the semiconductor layer 609a of the protrusion forming member 609 is formed such that the perimeters of both the first amorphous silicon layer and the second amorphous silicon layer run outside the concave portion 604t formed in the second insulating layer 604.

Further, in forming the active matrix substrate 6 of the fifth embodiment, the conductive layer 609b of the protrusion forming member 609 is formed at the same time the video signal line DL and the source electrode 607 are formed by etching a metal film. The conductive layer 609b of the protrusion forming member 609 is formed only inside the concave portion 604t, which is formed in the second insulating layer 604.

After that, with the video signal line DL and the source electrode 607 as a mask, the second amorphous silicon layer of the insular semiconductor film is etched. During the etching, the second amorphous silicon layer of the semiconductor layer 609a of the protrusion forming member 609 is etched as well. The second amorphous silicon layer of the protrusion forming member 609 therefore remains only inside the concave portion 604t, which is formed in the second insulating layer 604.

In forming the active matrix substrate 6 of the fifth embodiment, the ring-like concave portion 604t of the column spacer receiving portion is formed at the same time the contact hole CH is formed in the second insulating layer 604 to connect the pixel electrode PX and the source electrode 607 to each other. The first amorphous silicon layer in the semiconductor layer 609a of the protrusion forming member 609 is formed such that its perimeter runs outside the concave portion 604t. This way, the first amorphous silicon layer functions as an etching stopper and prevents the concave portion 604t from reaching, for example, the scanning signal line GL.

After the second insulating layer 604 and underlying layers are formed by the procedure described above, the pixel electrode PX and the column spacer receiving member 13 are formed, and then the alignment film 606 is formed. The active matrix substrate 6 of the liquid crystal display panel 1 of the fifth embodiment is thus obtained.

The alignment film 606 in this example is formed by applying or printing alignment film varnish and then performing heat treatment and rubbing as described in the first to fourth embodiments. The alignment film varnish that is applied to the column spacer receiving member 13, which is made of a transparent conductor such as ITO, therefore flows to the outside of the column spacer receiving member 13 and to a lower place. In the active matrix substrate 6 of the fifth embodiment, where the column spacer receiving portion has the ring-like concave portion 604t formed by etching the second insulating layer 604, the alignment film varnish that is applied to the central part (protrusion) of the column spacer receiving member 13 flows into the concave portion 604t of the second insulating layer 604.

This makes the alignment film varnish applied to the second insulating layer 604 very thin on the central part (protrusion) of the column spacer receiving member 13, or creates an opening in the column spacer receiving portion, exposing the central part (protrusion) of the column spacer receiving member 13. As a result, the alignment film 606 formed on the active matrix substrate 6 is very thin on the central part (protrusion) of the column spacer receiving member 13, or has an opening that exposes the central part (protrusion) of the column spacer receiving member 13.

The counter substrate 7 of the liquid crystal display panel 1 of the fifth embodiment is formed by the same procedure as in prior art, and a detailed description on the step of forming the counter substrate 7 is therefore omitted. The inventors of the present invention have formed the column spacer 10 approximately 4.2 μm in height on the overcoat layer 704, and then formed the alignment film 705 of the counter substrate 7 by the same procedure used to form the alignment film 606 of the active matrix substrate 6. The obtained alignment film 705 is approximately 100 nm in thickness in the opening area and approximately 5 nm in thickness above the top of the column spacer 10.

The inventors of the present invention have conducted a vibration test under the conditions given in the first embodiment on the liquid crystal display device that includes the liquid crystal display panel 1 of the fifth embodiment. No minute bright spots have been found in the tested liquid crystal display device.

The above-mentioned vibration test has been conducted on the liquid crystal display device that includes the liquid crystal display panel 1 of the fifth embodiment with the acceleration set to 2.5 G. No minute bright spots have been found in the tested liquid crystal display device also in this case.

Figure 13:
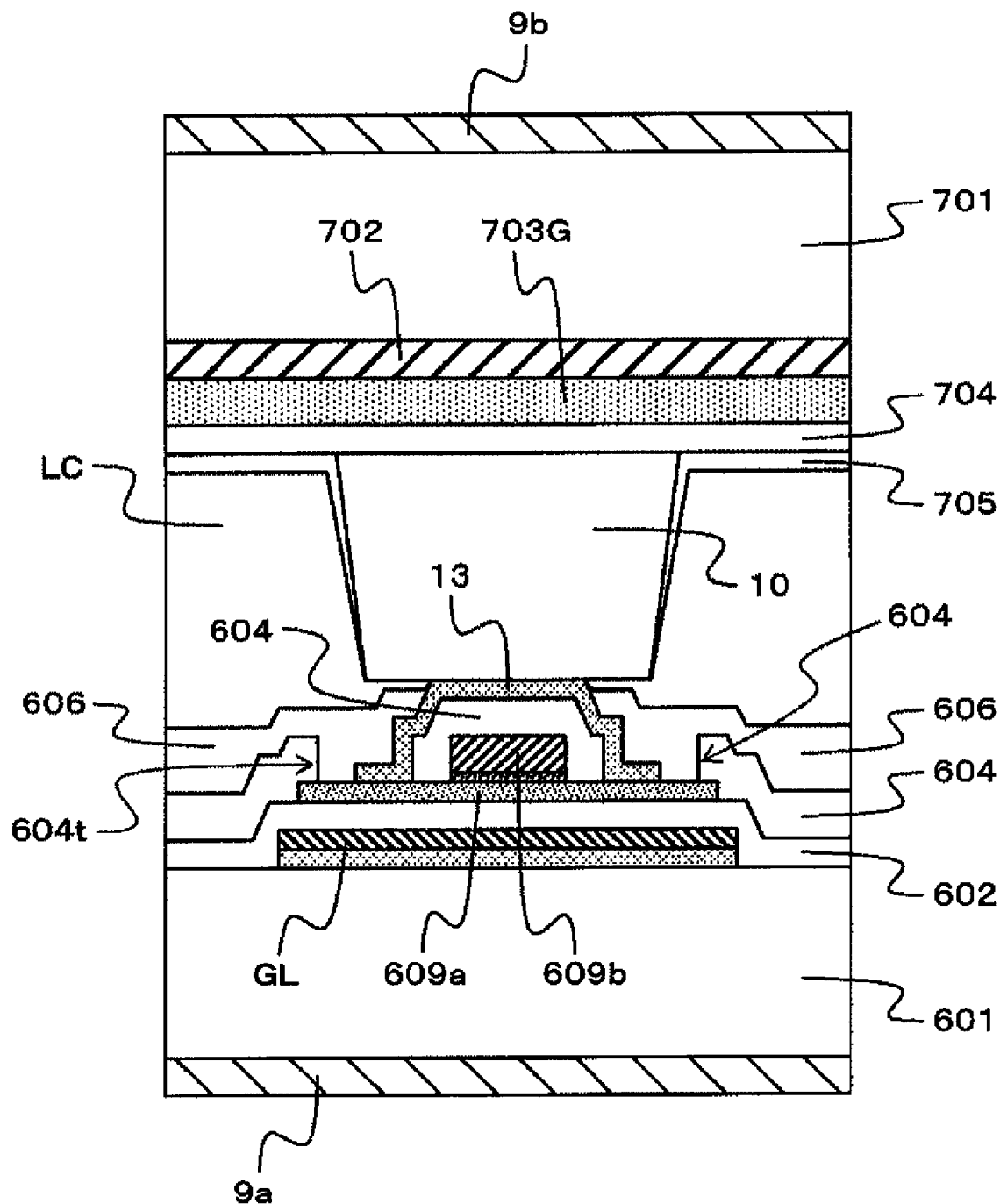
FIG. 13 is a schematic sectional view illustrating an example of a schematic structure of a liquid crystal display panel that is used for comparison with the liquid crystal display panel of the fifth embodiment.

FIG. 13 is a schematic sectional view illustrating an example of the schematic structure of a liquid crystal display panel that is used for comparison with the liquid crystal display panel of the fifth embodiment.

In order to check the effects of the liquid crystal display panel 1 of the fifth embodiment, the inventors of the present invention have made the active matrix substrate 6 in which the rim of the column spacer receiving member 13 runs inside the concave portion 604t formed in the second insulating layer 604 as illustrated in, for example, FIG. 13. The alignment film 606 of this active matrix substrate 6 has been relatively thick along the perimeter of the central part (the protrusion inside the concave portion 604t) of the column spacer receiving portion. The liquid crystal display panel of FIG. 13 is the same as the liquid crystal display panel 1 of the fifth embodiment except for the dimensions of the column spacer receiving member 13.

A vibration test has been conducted under the conditions given in the first embodiment on a liquid crystal display device including a liquid crystal display panel that uses the active matrix substrate 6 structured as illustrated in FIG. 13. Many minute bright spots have been observed in the tested liquid crystal display device.

As has been described, a liquid crystal display device that includes the liquid crystal display panel 1 of the fifth embodiment may avoid minute bright spots caused by the flaking of the part of each of the alignment films 606 and 705 that is interposed between the top of the column spacer 10 and the column spacer receiving member 13 due to vibrations applied during transportation or the like. This allows the liquid crystal display device that includes the liquid crystal display panel 1 of the fifth embodiment to, for example, lower the luminance of a part that is displayed in black color, and to improve the white/black contrast ratio accordingly. The shape of the column spacer receiving member 13 in plan view is not limited to the circular shape or the oval shape, and may be other shapes. However, when the column spacer receiving member 13 has an angular shape in plan view, the chance is high that alignment film varnish wetting and spreading floods the column spacer receiving member 13 from the corners of the angular shape. It is therefore desirable for the column spacer receiving member 13 to have a non-angular shape in plan view.

The column spacer receiving member 13 in the liquid crystal display panel 1 of the fifth embodiment may be formed from other materials than ITO, for example, a transparent conductor such as IZO, ITZO, ZnO, or $Sn_2O$. Alternatively, the column spacer receiving member 13 may be formed from other low-surface energy materials than the transparent conductive film described above.

In the case where the pixel electrode PX is formed from a transparent conductor such as ITO on the second insulating layer 604 of the active matrix substrate 6 as in the liquid crystal display panel 1 of the fifth embodiment, forming the column spacer receiving member 13 at the same time as the pixel electrode PX keeps the number of process steps for forming the active matrix substrate 6 from increasing, and prevents a rise in manufacture cost of the liquid crystal display panel 1.

The fifth embodiment takes as an example the lateral field driving liquid crystal display panel 1 that includes pixels structured as illustrated in FIGS. 4A, 4B, 12A, and 12B. However, the pixel structure (e.g., the shapes of the TFT device, the pixel electrode, and the common electrode in plan view (planar layout)) is not limited to the one illustrated in FIGS. 4A, 4B, 12A, and 12B and may be modified to suit individual purposes.

A specific description has been given on the mode of carrying out the present invention through the embodiments described above. However, the present invention is not limited to the above embodiments, and various modifications may be made thereto without departing from the spirit of the invention.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
   a first substrate;
   a second substrate which is opposed to the first substrate;
   a liquid crystal material which is placed between the first substrate and the second substrate;
   a plurality of column spacers and a first alignment film which are formed above the first substrate;
   an insulating layer which is formed on the second substrate and a second alignment film which is formed on the insulating layer; and
   column spacer receiving members which are provided between the insulating layer and the second alignment film in places opposed to the plurality of column spacers, without any layer interposed between the second alignment film and the column spacer receiving members, the column spacer receiving members each being comprised of a material different from both of a material comprising the insulating layer and a material comprising the second alignment film, the column spacer receiving members having rims that are formed in contact with the second alignment film,
   wherein a thickness of the second alignment film in places above the column spacer receiving members is ⅓ or less of a thickness of the second alignment film in places in which the second alignment film is formed directly on the insulating layer,
   wherein each of the plurality of column spacers has a substantially flat top facing toward an upper surface of a corresponding one of the plurality of column spacer receiving members which the column spacer is opposed to, and wherein planar dimensions of the substantially flat top of each of the column spacers overlap with and are substantially included entirely within the planar dimensions of the upper surface of the corresponding one of the plurality of column spacer receiving members which it faces a pair of electrodes for applying an electric field to the liquid crystal material, wherein at least one of the pair of electrodes is formed between the insulating layer and the second alignment film, and wherein the column spacer receiving members are each comprised of the same material as a material of the at least one of the pair of electrodes formed between the insulating layer and the second alignment film.

2. The liquid crystal display device according to claim 1, wherein the thickness of the second alignment film above the column spacer receiving members is 30 nm or less.

3. The liquid crystal display device according to claim 1, wherein the column spacer receiving members each have one of a circular shape and an oval shape in plan view.

4. The liquid crystal display device according to claim 1, wherein the column spacer receiving members each have a linear shape.

5. The liquid crystal display device according to claim 1, wherein the column spacer receiving members are each formed of a transparent conductive film.

6. The liquid crystal display device according to claim 1, wherein the column spacer receiving members are each comprised of indium-tin oxide.

7. The liquid crystal display device according to claim 1, wherein the second alignment film is formed thinner above the column spacer receiving members than above the at least one of the pair of electrodes formed between the insulating layer and the second alignment film.

8. The liquid crystal display device according to claim 1, wherein a distance from the second substrate to the column spacer receiving members is larger than a distance from the second substrate to the at least one of the pair of electrodes formed between the insulating layer and the second alignment film.

9. The liquid crystal display device according to claim 8, wherein the distance from the second substrate to the column spacer receiving members is larger by 400 nm or more than the distance from the second substrate to the at least one of the pair of electrodes formed between the insulating layer and the second alignment film.

10. The liquid crystal display device according to claim 1, wherein a distance from the second substrate to a central part of each of the plurality of column spacers is larger than a distance from the second substrate to a rim of the each of the plurality of column spacers.

11. The liquid crystal display device according to claim 1, further comprising at least one protrusion forming member which is formed between the second substrate and each of the column spacer receiving members.

12. The liquid crystal display device according to claim 1, wherein the insulating layer has a ring-like concave portion formed therein in each of areas in which the column spacer receiving members are formed, and
wherein each of the rims of the column spacer receiving members is located outside the ring-like concave portion.

13. The liquid crystal display device according to claim 1, wherein the plurality of column spacers each have one of a conical frustum shape and a prismoidal shape, and wherein planar dimensions of each of the column spacer receiving members are larger than planar dimensions of the flat top of each of the plurality of column spacers.

14. The liquid crystal display device according to claim 1, further comprising a column spacer overlying film which is formed on a top of each of the plurality of column spacers, the column spacer overlying film being comprised of the same material as the material of the column spacer receiving members.

15. The liquid crystal display device according to claim 14, wherein the column spacer receiving members and the column spacer overlying film are each comprised of indium-tin oxide.

16. The liquid crystal display device according to claim 14, further comprising a pair of electrodes for applying an electric field to the liquid crystal material,
wherein the pair of electrodes is formed above the first substrate.

17. A liquid crystal display device, comprising:
a first substrate;
a second substrate which is opposed to the first substrate;
a liquid crystal material which is placed between the first substrate and the second substrate;
a plurality of column spacers and a first alignment film which are formed above the first substrate;
an insulating layer which is formed on the second substrate and a second alignment film which is formed on the insulating layer, the second alignment film having openings formed therein in places opposed to the plurality of column spacers; and
column spacer receiving members which are formed in the openings of the second alignment film, the column spacer receiving members each being comprised of a material different from both of a material comprising the insulating layer and a material comprising the second alignment film, the column spacer receiving members having rims that are formed in contact with the second alignment film,
wherein each of the plurality of column spacers has a substantially flat top facing toward an upper surface of a corresponding one of the plurality of column spacer receiving members which the column spacer is opposed to, and wherein planar dimensions of the substantially flat top of each of the column spacers overlap with and are substantially included entirely within the planar dimensions of the upper surface of the corresponding one of the plurality of column spacer receiving members which it faces a pair of electrodes for applying an electric field to the liquid crystal material, wherein at least one of the pair of electrodes is formed between the insulating layer and the second alignment film, and wherein the column spacer receiving members are each comprised of the same material as a material of the at least one of the pair of electrodes formed between the insulating layer and the second alignment film.

18. The liquid crystal display device according to claim 17, wherein the column spacer receiving members each have one of a circular shape and an oval shape in plan view.

19. The liquid crystal display device according to claim 17, wherein the column spacer receiving members each have a linear shape.

20. The liquid crystal display device according to claim 17, wherein the column spacer receiving members are each formed of a transparent conductive film.

21. The liquid crystal display device according to claim 17, wherein the column spacer receiving members are each comprised of indium-tin oxide.

22. The liquid crystal display device according to claim 17, wherein the plurality of column spacers each have one of a conical frustum shape and a prismoidal shape, and wherein planar dimensions of each of the column spacer receiving members are larger than planar dimensions of the flat top of each of the plurality of column spacers.

* * * * *